(12) United States Patent
Roberts

(10) Patent No.: US 7,428,209 B1
(45) Date of Patent: Sep. 23, 2008

(54) NETWORK FAILURE RECOVERY MECHANISM

(76) Inventor: Lawrence G. Roberts, 170 Sunrise Dr., Woodside, CA (US) 94062

( * ) Notice: Subject to any disclaimer, the term of this patent is extended or adjusted under 35 U.S.C. 154(b) by 655 days.

(21) Appl. No.: 09/880,600

(22) Filed: Jun. 12, 2001

(51) Int. Cl.
*G01R 31/08* (2006.01)

(52) U.S. Cl. .................................. 370/217; 370/248

(58) Field of Classification Search ............... 370/217, 370/218, 221, 225, 227, 228, 238, 248
See application file for complete search history.

(56) References Cited

U.S. PATENT DOCUMENTS

| | | | |
|---|---|---|---|
| 4,345,116 A * | 8/1982 | Ash et al. ............... | 379/221.01 |
| 4,825,206 A * | 4/1989 | Brice et al. ............ | 340/825.02 |
| 6,034,958 A * | 3/2000 | Wicklund .............. | 370/395.32 |
| 6,167,025 A * | 12/2000 | Hsing et al. .................. | 370/216 |
| 6,215,765 B1 * | 4/2001 | McAllister et al. .......... | 370/217 |
| 6,272,107 B1 * | 8/2001 | Rochberger et al. ......... | 370/216 |
| 6,343,067 B1 * | 1/2002 | Drottar et al. ............... | 370/231 |
| 6,560,654 B1 * | 5/2003 | Fedyk et al. ................ | 709/239 |
| 6,671,819 B1 * | 12/2003 | Passman et al. ................. | 714/4 |
| 6,775,230 B1 * | 8/2004 | Watanabe et al. ............ | 370/228 |
| 6,990,063 B1 * | 1/2006 | Lenoski et al. .............. | 370/218 |
| 2003/0065811 A1 * | 4/2003 | Lin et al. ..................... | 709/232 |

\* cited by examiner

*Primary Examiner*—Firmin Backer
*Assistant Examiner*—Christine Ng
(74) *Attorney, Agent, or Firm*—West & Associates, A PC; Stuart J. West; Charlotte Rodeen-Dickert

(57) ABSTRACT

A mechanism for recovering from a failure in a network is disclosed, wherein a first set of information, such as a first packet, is initially sent from a source to a destination via a first route. As the packet travels along the first route, if a failure is detected somewhere along the route, a message is directed back to the source to inform it of the first route failure. In response to the message, the source reroutes one or more future packets intended for the destination to an alternate route rather than the first route. By doing so, the source routes around the failure to ensure that future packets will not be sent via the failed route. In addition, the source resends the first packet to the destination via the alternate route. By doing so, the source prevents the information from the first packet from being lost. By resending packets in this manner, the failure recovery mechanism makes it possible to not lose information during the recovery process.

12 Claims, 11 Drawing Sheets

| 502 | 504 | 506 |
|---|---|---|
| DESTINATION IP ADDRESS | PRIMARY EGRESS LINE CARD | ALTERNATE EGRESS LINE CARD |
| IP 1 | | |
| IP 2 | | |
| ⋮ | ⋮ | ⋮ |

NETWORK FAILURE RECOVERY MECHANISM

FIELD OF THE INVENTION

This invention relates generally to networking, and more particularly to a mechanism for quickly and efficiently recovering from a failure in a network.

BACKGROUND

Today's highly complex networks, such as the Internet, comprise thousands of routers, and myriad links connecting the various routers. This complex mesh enables almost any machine (e.g. client, server, etc.) to access any machine, and provides great flexibility in determining the route from one machine to another. Because of the number of components involved, and the highly complex and delicate nature of the components, failures in a complex network are inevitable. These failures may be caused by software crashes, hardware defects, or human error (e.g. someone accidentally unplugging a card from a slot or construction work severing a fiber or cable). Because failures are inevitable, it is important to implement one or more failure recovery mechanisms in a network so that when a failure does occur, it does not unduly disrupt network traffic or lead to catastrophic results. Overall, the failure recovery mechanism should minimize the impact that a failure has on a network. With this goal in mind, several recovery strategies have been developed and implemented in the prior art.

A first strategy, typically implemented at the physical layer of a network, involves the use of redundant links. Under this approach, between any two components for which failure recovery is implemented, there is provided two separate links. One of the links is used to carry all of the traffic, while the other link remains idle. When a failure is detected on the currently active link, all of the traffic is detoured to the previously idle link, and all traffic is thereafter carried on that link. Since this strategy is implemented on the physical layer of the network, the switchover in links is transparent to components on the upper layers of the network. Hence, recovery from the failure is carried out seamlessly and transparently.

This approach has a number of significant drawbacks, however. The first is high cost. Because multiple links need to be maintained between all components for which failure recovery is desired, the cost of the network in terms of links is multiplied. Network components are currently already expensive. Increasing the cost by a multiple would render this approach impracticable in many implementations. A second drawback is inefficiency. Notice that only one of the links is used at any one time. This means that, at most, the best efficiency that can be achieved is 50%. Another drawback of this approach is that it has relatively slow recovery speed. In an optical network, for example, where this approach is implemented on the physical SONET layer using APS, it takes approximately 50 ms (milliseconds) to implement a full recovery once failure has been detected. In terms of network traffic, 50 ms is a fairly long time. This is especially true in light of the fact that during the entire recovery time, all traffic directed to the failed link is lost. Given the shortcomings discussed above, the redundant links approach does not provide satisfactory results.

Another approach that has been implemented involves the use of topology information at the routing layer of a network. Under this approach, whenever a router detects a failure adjacent to itself (e.g. a link failure or a router failure), the router: (1) updates its topology information and forwarding tables to route around the failed link or router so that the failed component is no longer referenced or used in the future; and (2) broadcasts information pertaining to the failure to all of its adjacent routers. This information broadcast may be made using a link state protocol, such as IS-IS (intermediate system-intermediate system), BGP (border gateway protocol), or OSPF (open shortest path first), to name a few. Upon receiving the failure information, each adjacent router in turn: (1) updates its topology information and forwarding tables to route around the failed component; and (2) broadcasts the failure information to all of its adjacent routers. As the failure information propagates from router to router in the manner described, the topology information for the entire network eventually converges to the point where none of the routers in the network references or sends information to the failed component anymore. Once that convergence takes place, the failed component is no longer used, and recovery from the failure is complete.

The main problem with this approach is that it is extremely slow. In a typical large-sized network, it requires approximately 30 seconds for the topology information of the entire network to converge. During this time, traffic continues to be routed to the failed component and dropped. In 30 seconds, a vast amount of traffic can be lost, and if any of this traffic is time-critical, such as streaming video or audio, or unrecoverable, the consequences can be grave. In short, this approach is just too slow to be practicable in many if not most implementations. As a result, an improved mechanism for recovering from a network failure is needed.

SUMMARY

In light of the shortcomings of the prior art, the present invention provides an improved mechanism for recovering from a network failure, which enables recovery to be achieved in a very short amount of time, and which does not require the use of redundant links. In one embodiment, the failure recovery mechanism is implemented within a router on a routing layer of a network, and the mechanism is capable of recovering from both a failure within the router and a failure external to the router.

In one embodiment, failure recovery is carried out as follows. Initially, a first set of information, such as a first packet, is sent from a source to a destination via a first route. Used in this context, the source may be, for example, an ingress line card of the router, and the destination may be a machine (e.g. a client or server) external to the router to which the packet is destined. As the packet travels along the first route, if a failure is detected somewhere along the route, a message is directed back to the source to inform it of the first route failure. Because the source is directly informed of the route failure instead of having to wait for topology information to be slowly propagated back to it, the source is able to react quickly to the failure. In response to the message, the source reroutes one or more future packets intended for the destination to an alternate route rather than the first route. By doing so, the source routes around the failure to ensure that future packets will not be sent via the failed route. In this manner, failure recovery is achieved. Implemented in this way, it has been estimated that failure recovery may be achieved in approximately 10 ms or even less, which is significantly faster than what is achievable with the prior art. In addition, the recovery is achieved without having to implement any redundant links.

In addition to preventing loss of future packets, the failure recovery mechanism may also be used to prevent loss of packets that have already been sent, such as the first packet that caused the route failure to be detected. As noted above, when a failure is detected, a message is directed back to the source to inform the source of the route failure. This message need not be limited to just information pertaining to the route failure. Rather, it may include all or a portion of the first packet, including the data portion of that packet. If the message back to the source includes all of the pertinent information from the first packet, then when the source receives the message, it can resend the first packet to the destination, this time via the alternate route. By doing so, the source prevents the information from the first packet from being lost. By having returned packets resent in this manner, the failure recovery mechanism makes it possible to minimize information loss during the recovery process. This is in sharp contrast to the prior art, which loses information until the recovery process is completed. As this discussion illustrates, the present invention is capable of achieving failure recovery quickly, cost-effectively, and without losing information. Consequently, it represents a significant advance over the prior art.

DETAILED DESCRIPTION OF EMBODIMENT(S)

Network Overview

Figure 1:
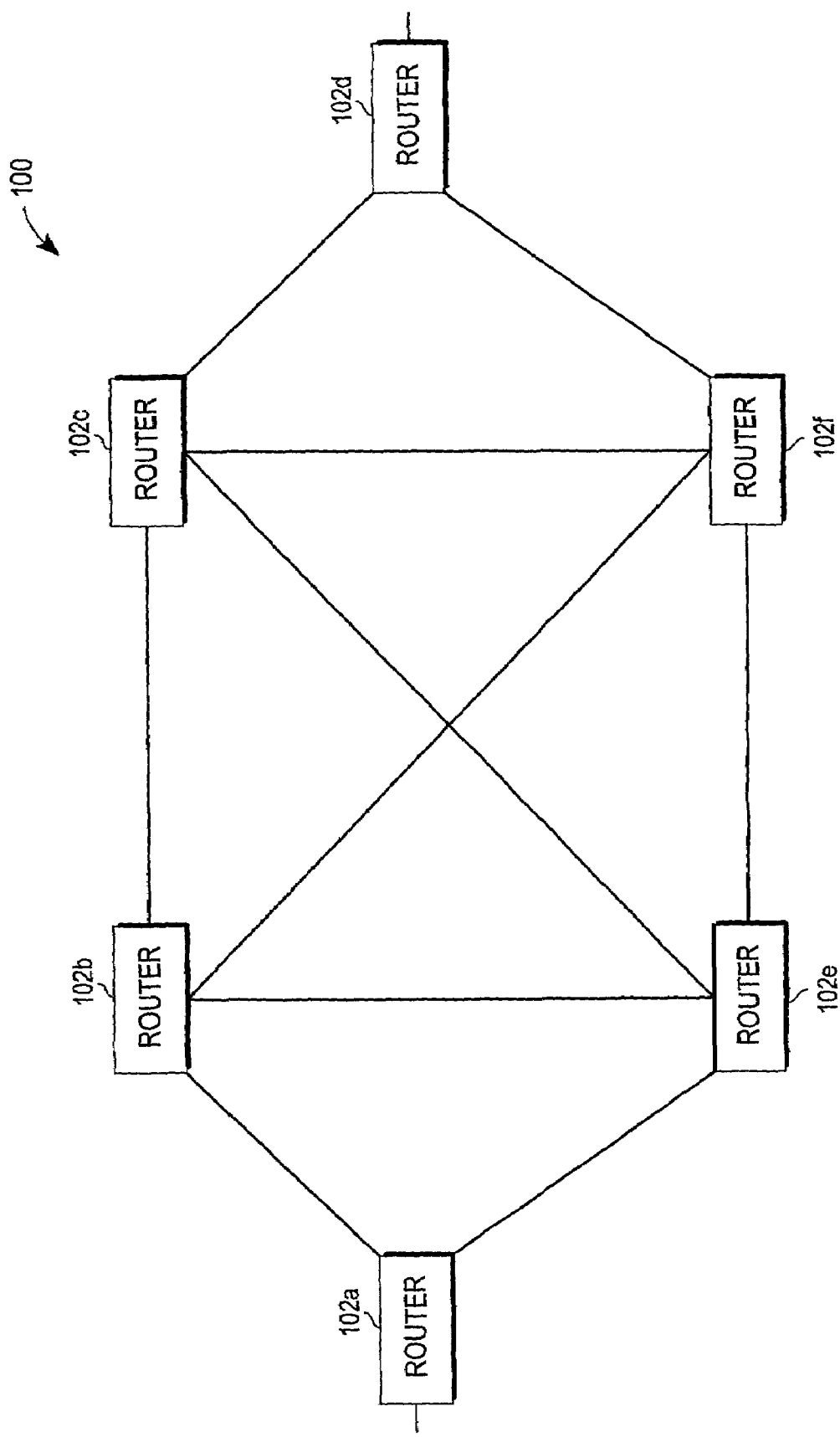
FIG. 1 is an overview of a network in which one embodiment of the present invention may be implemented.

With reference to FIG. 1, there is shown an overview of a network 100 in which one embodiment of the present invention may be implemented. As shown, the network 100 comprises a plurality of routers 102 interconnected to each other by trunks or links in such a way that each router 102 has multiple possible paths to every other router 102. For example, information from router 102a may reach router 102d by going through routers 102b and 102c, or routers 102e and 102f, and information from router 102c may reach router 102a by going through router 102b or router 102e. Interconnecting the routers 102 in this way provides flexibility in determining how information from one router 102 is delivered to another, and makes it possible to route around any failures that might arise. For the sake of simplicity, only a few routers 102 are shown in FIG. 1; however, it should be noted that network 100 may be much more complex if so desired, comprising more routers 102, more connections between the routers 102, and other components. In addition to being coupled to each other, each router 102 may further be coupled to various machines (not shown), such as clients and servers, from which information originates and to which information is destined. By going through the routers 102, each of these machines may send information to any of the other machines in the network 100.

For purposes of the present invention, a router 102 may be any mechanism capable of receiving and forwarding a set of information to a particular destination. Because there may be several hops before the destination is reached, a router 102 does not necessarily forward the set of information directly to the destination. It does, however, send the information to another router 102 along a path that eventually leads to the destination. In forwarding information from one router 102 to another, a forwarding protocol is used. A number of forwarding protocols are currently known, including but not limited to MPLS (multi-path label switching) and IP (internet protocol), with IP being the most dominant. Since IP is currently the most prevalent, the following description will be made assuming that IP is the forwarding protocol. It should be noted though that other forwarding protocols may be used, if so desired. The forwarding protocol makes it possible for the various routers 102 to understand each other when forwarding information. So long as a common protocol is used, different routers 102 having different construction and made by different manufacturers can be implemented in the same network 100. Thus, network 100 may be a heterogeneous network comprising various types of routers 102.

In addition to a forwarding protocol, the routers 102 may also share information using a routing protocol, such as for example IS-IS, BGP, and OSPF, to name a few. Using such a protocol, the routers 102 can exchange topology information relating to the network 100. The topology information specifies which router 102 is coupled to which other router(s) in the network 100, and in effect provides a map of the entire network 100. Using this topology information, the various routers 102 can determine the routes or paths that can be taken to deliver a set of information to a particular destination. The use of topology information will be discussed in greater detail in a later section.

Information is conveyed from one router 102 to another via a physical link or trunk. Depending on the type of network, this link or trunk may be an optical medium (e.g. an optical fiber), a coaxial cable, or some other type of medium. For purposes of the present invention, network 100 may use any type of transport medium.

Router Overview

Figure 2:
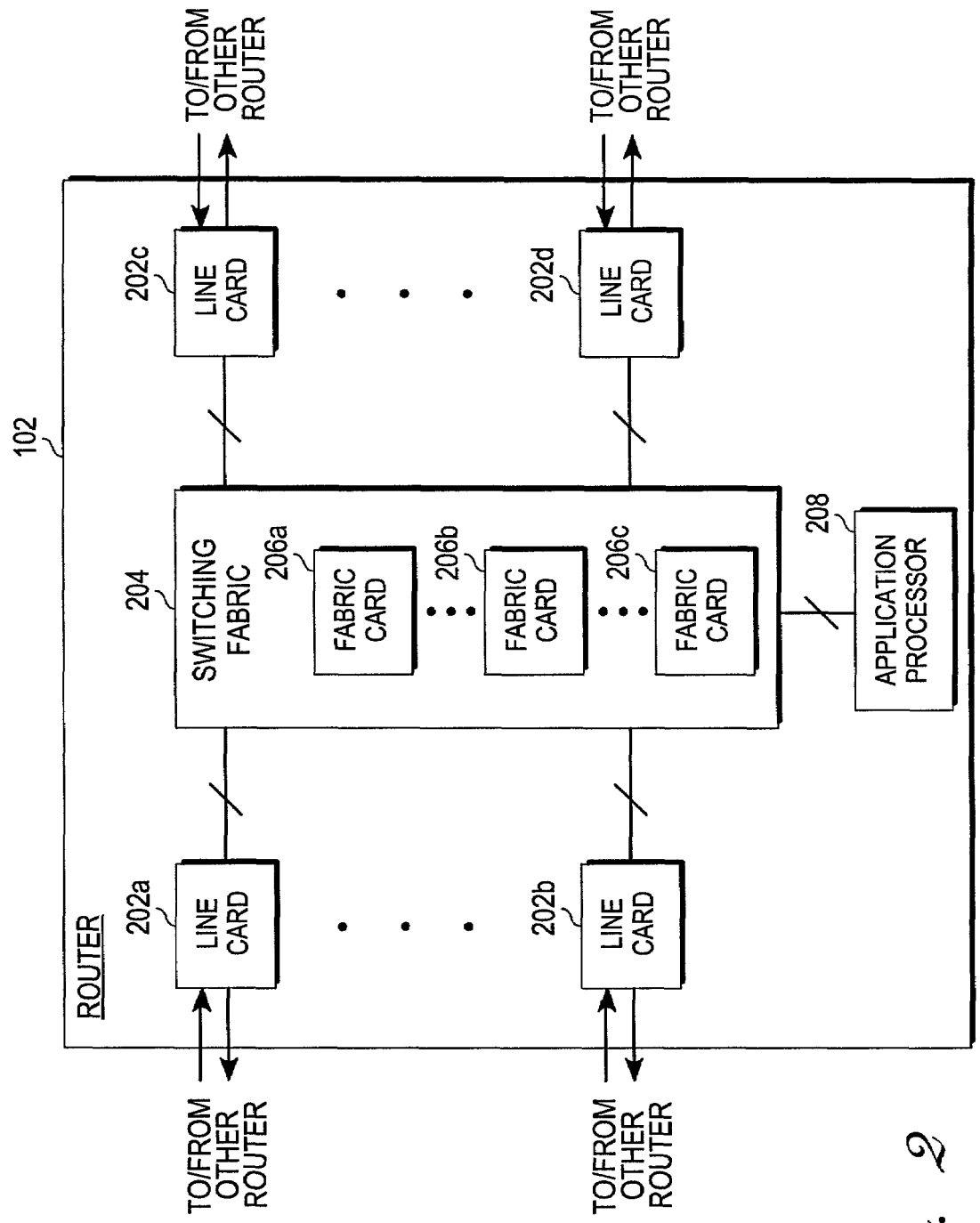
FIG. 2 is a block diagram of a router in which a failure recovery mechanism in accordance with one embodiment of the present invention may be implemented.

As noted previously, it is desirable to implement a failure recovery mechanism in a network 100 to minimize the effect that a failure will have on network traffic. Accordingly, embodiments of the present invention provide an improved failure recovery mechanism (FRM), which enables failure recovery to be achieved quickly, efficiently, cost-effectively, and without losing information. In one embodiment, the FRM is implemented within a router 102 on the routing layer of the network 100. Even though it is implemented within a router 102, the FRM is capable of recovering from both a failure within the router 102 and a failure external to the router 102, as will be described. A block diagram of a router 102 in which one embodiment of the FRM may be implemented is shown in FIG. 2. Since the network 100 may be heterogeneous, all or just some of the routers 102 in the network 100 may have this configuration.

As shown in FIG. 2, the router 102 comprises a plurality of line cards 202 for coupling the router 102 to one or more of the other routers 102 in the network 100. For example, assuming that the router 102 in FIG. 2 is router 102b in network 100, line card 202d may couple router 102b to router 102f, line card 202c may couple router 102b to router 102c, line card 202b may couple router 102b to router 102e, and line card 202a may couple router 102b to router 102a. Overall, the line cards 202 act as the router's 102 interfaces to the rest of the network 100. In one embodiment, the trunks coupled to the line cards 202 are bi-directional; thus, each line card 202 may receive information from another router, or send information to another router. Put another way, each line card 202 is capable of acting as an ingress line card (to receive information) or an egress line card (to send information). Whether a particular line card 202 is acting as an ingress or an egress line card at any particular time depends upon the flow of network traffic.

To couple the line cards 202 to each other within the router 102, there is provided an internal switching fabric 204. In one embodiment, the switching fabric 204 comprises a plurality of interconnected fabric cards 206. Basically, the switching fabric 204 provides a mechanism for coupling any line card 202 to any other line card 202 within the router 102 so that information can be transported from any ingress line card 202 to any egress line card 202. By transporting information from an ingress line card 202 to an egress line card 202, the switching fabric 204 routes information through the router 102 and sends it on its way to the next hop (i.e. the next router). Information is thus received and routed by the router 102.

To increase the flexibility of the router 102 and to facilitate the process of failure recovery, each line card 202, in one embodiment, has multiple connections to the switching fabric 204. In addition, the switching fabric 204 provides multiple routes for connecting each line card connection to every other line card connection. With such a setup, each line card 202 has multiple routes to every other line card 202 in the router 102. For example, one possible route from line card 202d to line card 202a may pass through fabric card 206c, while another route may pass through fabric card 206b. By providing multiple routes between the various line cards 202, the switching fabric 204 makes it possible to route around any internal failures that may arise. This ability of the switching fabric 204 to route around failures will be exploited in implementing the FRM. Together, the line cards 202 and the fabric cards 206 cooperate to implement the FRM of the present invention, as will be described in greater detail in a later section.

In addition to the line cards 202 and the switching fabric 204, the router 102 further comprises an application processor 208. In one embodiment, the application processor 208 determines the forwarding paths, and hence, the egress line cards, that can be used to forward information to any particular destination IP address. Put another way, given a destination IP address, the application processor 208 determines which line card 202 or line cards are most suitable to act as the egress line card to forward information to that destination IP address. For example, suppose that the router 102 in FIG. 2 is router 102b in network 100, and that the destination is a machine coupled to router 102d. Suppose further that line card 202c is coupled to router 102c and line card 202d is coupled to router 102f. In such a case, because the most direct routes to router 102d are through either router 102c or 102f, the most suitable egress line cards for forwarding information to the destination router 102d are probably line cards 202c and 202d. Accordingly, the application processor 208 designates these line cards 202c, 202d as potential egress line cards for destination router 102d, with one being designated as the primary egress line card and the other being the alternate. In one embodiment, whenever possible, the application processor 208 determines at least two possible egress line cards 202 for every destination IP address. Providing multiple potential egress line cards makes it possible to route around external failures, as will be discussed in a later section.

In one embodiment, the application processor 208 determines the potential egress line cards for each destination IP address based upon several different factors. One possible factor is the topology of the network 100. As noted previously, routers 102 within the network 100 exchange information about the layout of the network 100. Based upon this topology information, the application processor 208 performs an analysis to determine the optimal paths (e.g. the shortest paths) between the current router 102 and a particular destination. The line cards 202 that are on these paths are selected as the potential egress line cards 202 for that destination. Another factor that may be taken into consideration is traffic load. If the trunk coupled to a potential egress line card is particularly congested, then in the interest of load balancing the application processor 208 may decide not to use that line card 202 as an egress line card for that destination. Topology and load balancing are just some of the factors that may be taken into account in determining the potential egress line cards for each destination IP address. Many other factors may be taken into consideration, if so desired.

Once the egress line card determinations are made by the application processor 208 for each destination IP address, they are communicated to each of the line cards 202 in the router 102. In turn, each line card 202 stores the information into a forwarding table residing on the line card 202. Thereafter, when a line card 202 acts as an ingress line card and receives a set of information, it can use the forwarding table to determine the appropriate egress line card 202 to which to forward the information. Because the egress line card information is predetermined and stored in the forwarding table, the ingress line card simply has to perform a table lookup to determine the proper egress line card. No on-the-fly calculation needs to be performed. Since table lookup operations can be carried out very quickly, the process of determining the proper egress line card requires relatively little time.

Line Card

Figure 3:
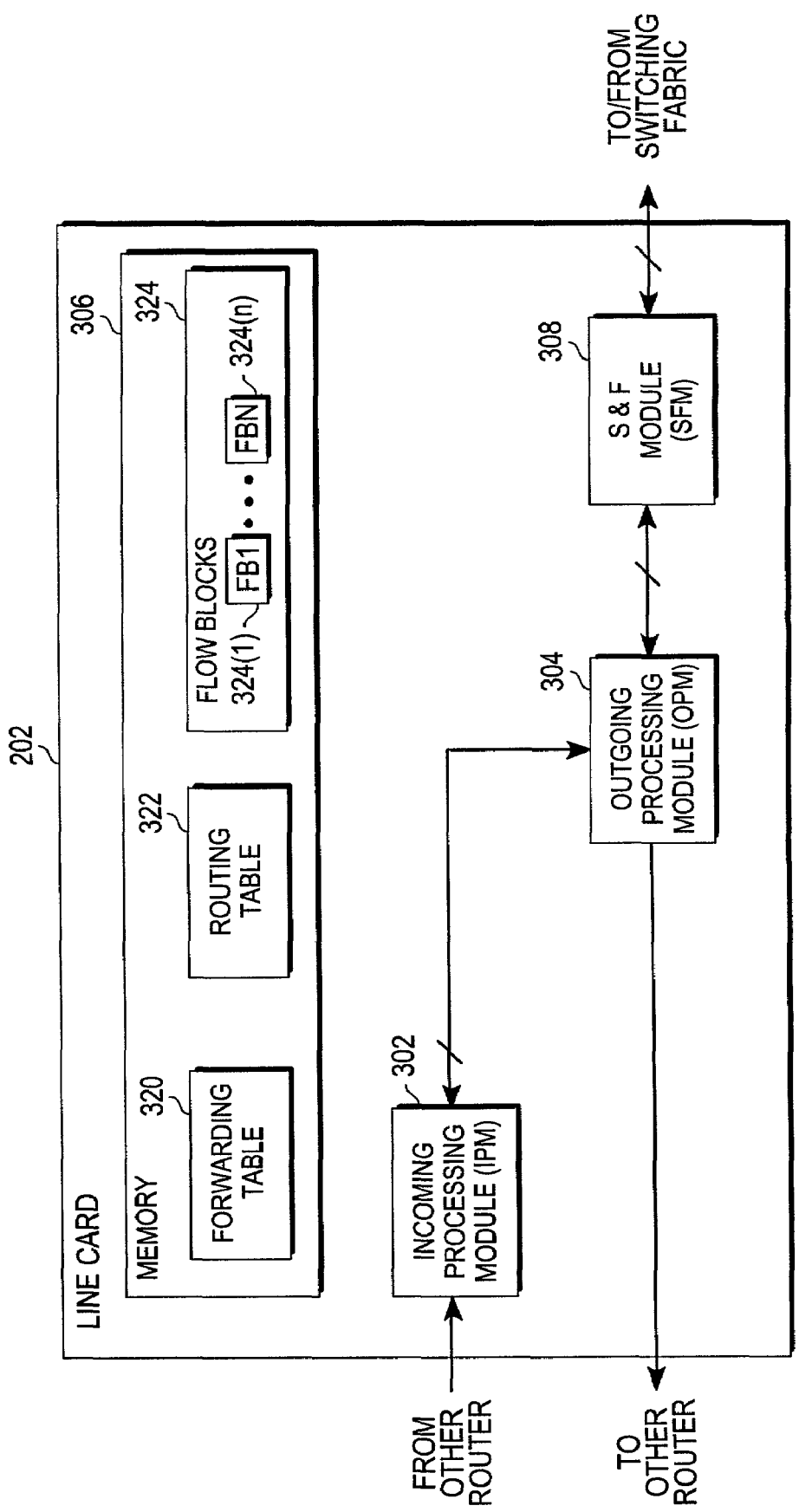
FIG. 3 is a block diagram of a line card in accordance with one embodiment of the present invention.

As noted previously, the line cards 202 and fabric cards 206 within the router 102 cooperate to implement the FRM of the present invention. To describe the line cards 202 in greater detail, reference will be made to the block diagram shown in FIG. 3, which depicts one possible embodiment of each of the line cards 202 in router 102. As shown in FIG. 3, the line card 202 comprises an incoming processing module (IPM) 302, an outgoing processing module (OPM) 304, a memory 306, and a store and forward module (SFM) 308.

In one embodiment, the IPM 302 serves as the interface for incoming communications from the other routers of the network 100. When a set of information such as an IP packet is received, the IPM 302 prepares the packet for routing to another line card on the router 102. When processing an incoming packet from another router, the line card 202 shown in FIG. 3 acts as the ingress line card, and the line card to which the packet is to be routed acts as the egress line card. In preparing the packet for routing, the IPM 302 determines the proper egress line card for the packet. In one embodiment, the IPM 302 carries out this function by extracting a destination IP address from the packet and consulting the forwarding table 320 in the memory 306 to determine the proper egress line card for the given destination IP address. As an alternative, the egress line card may be ascertained by consulting one of the flow blocks 324 (as will be explained in a later section). After the egress line card is determined, the IPM 302 forwards the packet to the OPM 304 for routing to the egress line card.

By the time the OPM 304 receives the incoming packet, all that has been determined is the egress line card to which the packet is to be routed. The actual route that is to be taken through the switching fabric 204 to get to the egress line card has not been ascertained. Thus, one of the functions of the OPM 304 is to determine a proper route through the switching fabric 204. In one embodiment, the OPM 304 determines a proper route to the egress line card by consulting the routing table 322 in memory 306. After a route to the egress line card is determined, the OPM 304 appends the route to the packet, and sends the packet to the SFM 308 for routing through the switching fabric 204. With the route thus specified in the packet, the SFM 308 and the switching fabric 204 will, barring a failure, convey the packet to the proper egress line card.

In addition to routing incoming packets to an egress line card, the OPM 304 also may act as an interface for sending outgoing packets to another router. For example, if the line card 202 in FIG. 3 is selected as the egress line card for a particular packet, then the OPM 304 receives an outgoing packet, through the switching fabric 204 and the SFM 308, from another line card. In response, the OPM 304 processes the outgoing packet, and forwards it to the router to which the OPM 304 is coupled. The outgoing packet is thus routed through the egress line card 202 to the other router. In addition to the functions discussed above, the OPM 304 also implements many of the functions of the FRM. These functions will be described in greater detail in a later section.

To send information to, and to receive information from the switching fabric 204, the OPM 304 goes through the SFM 308. In effect, the SFM 308 acts as the interface between the line card 202 and the switching fabric 204 of the router 102. In one embodiment, the OPM 304 has multiple links to the SFM 308, and the SFM 308 in turn has multiple links to the switching fabric 204. These multiple links, which in one embodiment are bi-directional, provide great flexibility in conveying information from one line card to another. If one link fails, then another link may be used in its place.

Unless all of the possible links between two line cards are disabled, communication between the lines cards is not precluded. In the embodiment shown in FIG. 3, the SFM 308 is depicted as being coupled to the switching fabric 204. If so desired, the SFM 308 may also be coupled directly to the SFM 308 of one or more other line cards 202. For example, the SFM 308 of line card 202a may be directly coupled to the SFM 308 of line card 202b. With such a direct coupling, line cards 202 may exchange information directly with each other without going through the switching fabric 204. This and other implementations are possible.

For purposes of the present invention, the SFM 308 may take on many different forms. In one embodiment, the SFM 308 takes on the form of a multi-port switch comprising a plurality of bi-directional ports. A plurality of the ports are coupled to the OPM 304, while the remainder of the ports are coupled to the switching fabric 204. In such a switch, each port may act as an input port or an output port, and each port may be selectively coupled (i.e. switched) to any port. With such a switch, information may enter at any port, get switched, and exit at any port. There are many possible implementations for this type of switch. One possible implementation is described in co-pending U.S. patent application Ser. No. 09/703,188, entitled "Single Hop, High Dimensionality Switching Component", filed Oct. 31, 2000, which is incorporated entirely herein by this reference. Other implementations are also possible.

In one embodiment, to switch information from one port of the switch to another, a route byte is used. This route byte may be expressed in terms of an offset. Basically, the route byte provides an indication to the port that is receiving a set of information which port is the intended output port. Based upon the route byte, the switch switches the set of information to the proper output port. For example, suppose that a switch has 24 ports and that a set of information enters the switch at port 5. Suppose further that the set of information contains a route byte, which is expressed in terms of an offset, and which has a value of 6. To determine the proper output port, the offset is added to the port number of the input port. In this example, the input port number is 5; thus, the result of the addition operation is 11, which means that port 11 is the desired output port. Accordingly, the set of information is switched to port 11 and outputted therefrom. The information is thus received and forwarded by the SFM 308.

Figures 5, 7:
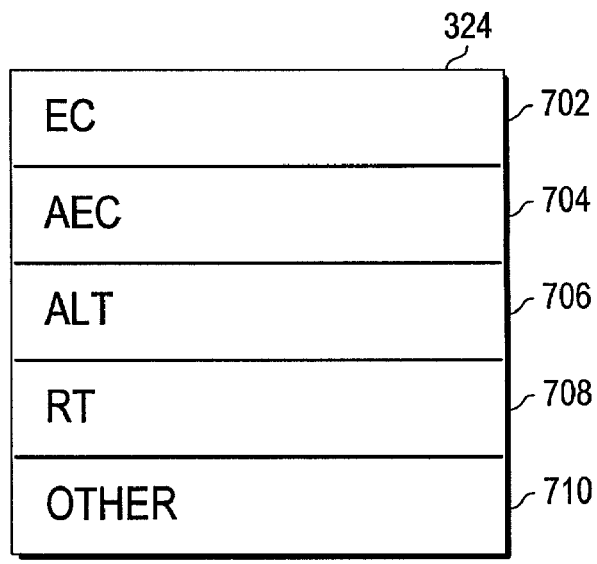
FIG. 5 shows one possible embodiment of the forwarding table of FIG. 3.
FIG. 7 shows one possible embodiment of one of the flow blocks of FIG. 3.

In determining the proper routing of a packet through the router 102, the IPM 302 and the OPM 304 consult and rely upon information stored in the memory 306. In one embodiment, this information includes forwarding table 302, routing table 322, and one or more flow blocks 324. With reference to FIG. 5, there is shown one possible embodiment of the forwarding table 320. As shown, the forwarding table 320 comprises three columns: a destination IP address column 502, a primary egress line card column 504, and an alternate egress line card column 504. Each entry in column 502 stores a particular IP address, each entry in column 504 stores an identifier of a particular line card 202 in the router 102, and each entry in column 506 likewise stores an identifier of a particular line card 202 in the router 102. Basically, the forwarding table 320 specifies, for each IP address, two line cards that may be used as the egress line card for forwarding information to that IP address. Using this information, the IPM 302 can quickly and easily determine, given an incoming packet and a destination IP address, which line card 202 of the router 102 may be used as the egress line card for that packet. As noted previously, the information stored in the forwarding table 320 is pre-calculated and provided by the application processor 208. Thus, when determining an egress line card for a packet, the IPM 302 need not perform any complex or time consuming routing calculations. Instead, it carries out a simple table lookup operation. By simplifying the egress line card determination process, the routing process is made much faster and more efficient. In one embodiment, the information contained in the forwarding table 320 applies to all of the line cards 202 in the router 102. Thus, the same table 320 may be stored in all of the line cards 202 of the router 102.

Figure 6:
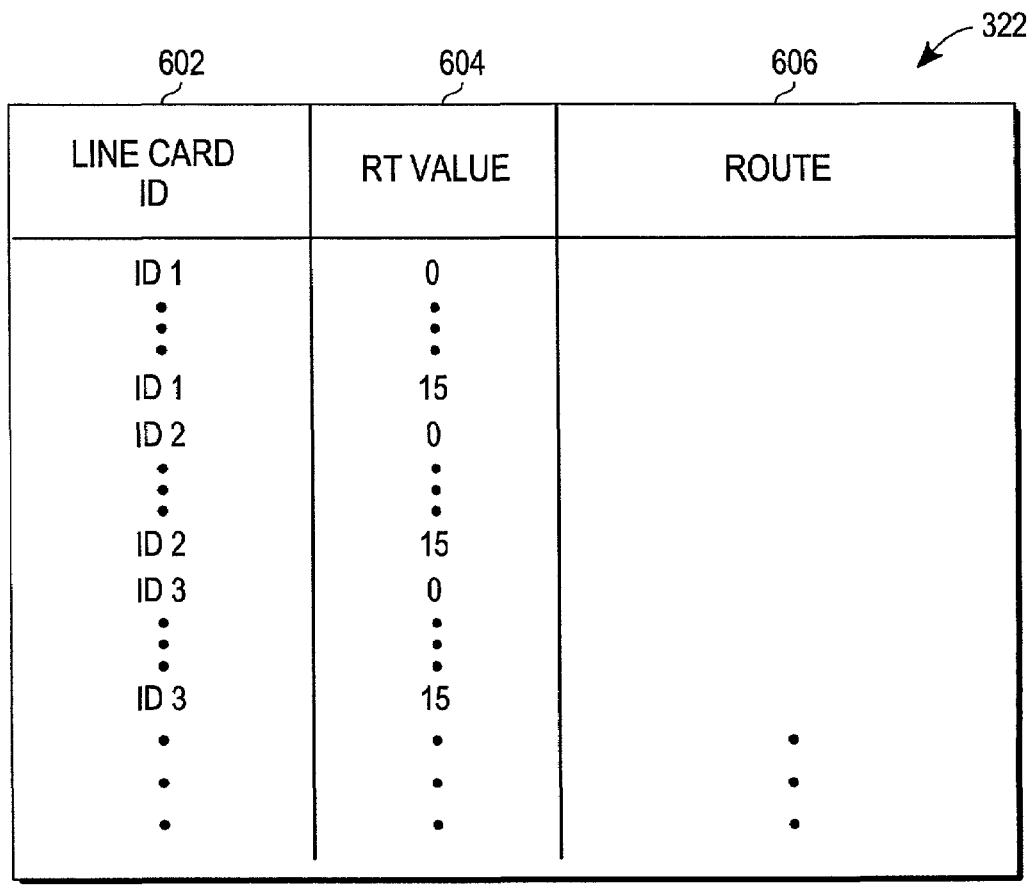
FIG. 6 shows one possible embodiment of the routing table of FIG. 3.

In addition to the forwarding table 320, the memory 206 further comprises routing table 322. As noted previously, the routing table 322 is used by the OPM 304 to determine a route though the switching fabric 204 of the router 102 to a particular egress line card. With reference to FIG. 6, there is shown one possible embodiment of the routing table 322. As shown, the routing table 322 comprises a line card ID column 602, an RT value column 604, and a route column 606. In each entry of column 602, there is stored an identifier of a particular line card 202 in the router 102. In each entry of column 604, there is stored a value between 0 and 15, and in each entry of column 606, there is stored a sequence of one or more route bytes. The route bytes define a route through the router 102 to the line card identified in the line card ID column 602. When appended to a packet, the route bytes serve to guide the packet through the SFM 308 and the switching fabric 204 of the router 102 to the identified line card. The route bytes will be described in greater detail in a later section.

As shown in FIG. 6, there are 16 rows in the routing table 322 for each line card identifier. For example, there are 16 rows having the line card identifier ID1, 16 rows having the line card identifier ID2, and so on. This means that for each line card, the routing table 322 provides 16 potential routes to that line card. This flexibility in routes greatly facilitates the failure recovery process. In one embodiment, the routes in table 322 are predetermined based upon the topology of the switching fabric 204 (note: this topology is not the same as the network topology discussed previously). In addition, the routes are ordered such that consecutive routes to the same line card are as diverse as possible. For example, for line card ID1, route 1 is diverse relative to route 0. Likewise, route 2 is diverse relative to route 1. Used in this context, diverse means that the routes have as little in common as possible, in terms of links, fabric cards 206, etc. The significance of this diversity will be made clear in a later section. In the example shown in FIG. 6, there are 16 possible routes for each line card 202. This is for illustrative purposes only. If so desired, more or fewer potential routes may be specified.

A point to note regarding routing table 322 is that, unlike the forwarding table 320, the routing table 322 is unique to each line card 202. That is, each line card 202 has a different routing table 322. This is because the routing table 322 specifies the potential routes from a particular line card 202 (i.e. the line card on which the routing table 322 is stored) to every other line card 202 in the router 102. Since the routes to a line card 202 will differ depending upon the starting line card, each line card has different routes to every other line card. Thus, the routing table 322 will vary from line card to line card.

In addition to the forwarding table 320 and the routing table 322, the memory 306 may further optionally comprise flow blocks 324 for maintaining information pertaining to particular flows. Used in this context, a flow refers generally to multiple sets of information or packets that are related to each other in some way. For example, all of the packets in a flow may be destined for the same IP address. In addition, all of the packets in a flow may be part of a particular transaction, a particular video or audio stream, a particular transmission, etc. A flow may be an aggregate flow comprising a large number of transactions, or it may be a microflow comprising a single transaction. The concept of a microflow is described in co-pending U.S. application Ser. No. 09/552,278, entitled "Micro-Flow Management", filed Apr. 19, 2000, which is incorporated entirely herein by this reference. Using a flow block 324, all of the packets in a flow may be routed in a consistent manner.

With reference to FIG. 7, there is shown one possible embodiment of a flow block 324, wherein the flow block 324 comprises a primary egress line card field (EC) 702, an alternate egress line card field (AEC) 704, an ALT field 706, an RT field 708, and one or more additional fields 710 for storing other information (e.g. Qos parameters) pertaining to a flow. In one embodiment, the flow block 324 is created and maintained by the IPM 302, and a separate flow block 324 is maintained for each flow that is processed by the line card 202.

In the EC field 702, there is stored an identifier of an egress line card in the router 102. Likewise, in the AEC field 704, there is stored an identifier of another egress line card in the router 102. Basically, these fields 702, 704 specify the primary and alternate egress line cards, respectively, for the flow. Using this information, the IPM 302 can quickly determine the proper egress line card to which the packets in the flow should be routed. In the Alt field 706, there is stored an indication of whether the primary or alternate egress line card should be used. In one embodiment, a flag is stored in field 706 having a value of 0 or 1. If Alt is 0, then the packets should be routed to the primary egress line card. If Alt is 1, then the packets should be routed to the alternate egress line card. The Alt flag 706 provides a convenient mechanism for rerouting packets to the alternate egress line card when that is needed. The flow block 324 further comprises the RT field 708. In one embodiment, a value between 0 and 15 is stored in this field 708. The OPM 304 uses this value in selecting a route to the egress line card from the routing table 322. Creation and use of the flow block 324 will be described in greater detail in a later section.

Fabric Card

Figure 4:
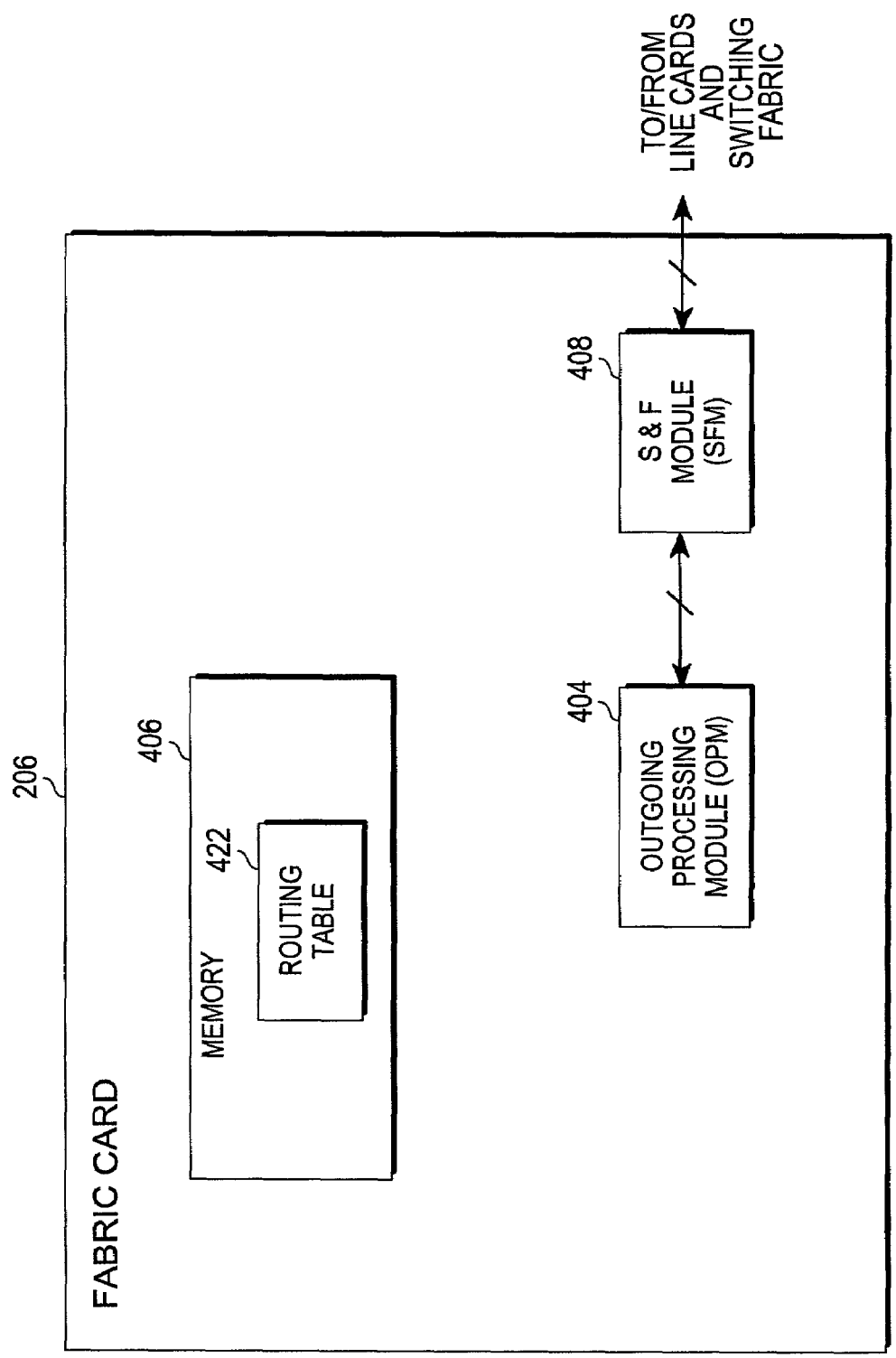
FIG. 4 is a block diagram of a fabric card in accordance with one embodiment of the present invention.

As noted previously, the fabric cards 206 cooperate with the line cards 202 to implement the FRM of the present invention. To describe the fabric cards 206 in greater detail, reference will be made to FIG. 4, which depicts one possible embodiment of each of the fabric cards 206 in the switching fabric 204. As shown, fabric card 206 comprises an outgoing processing module (OPM) 404, a memory 406 comprising a routing table 422, and a store and forward module (SFM) 408. In one embodiment, the OPM 404 and the SFM 408 cooperate to implement the FRM functions of the fabric card 206. More specifically, in one embodiment, the SFM 408 detects failures when routing packets. When a route failure is detected, the SFM 408 forwards the failed packet to the OPM 404. In turn, the OPM 404 sends a message to the ingress line card 202 that sent the packet to inform the ingress line card of the failure. By informing the ingress line card in this way, the OPM 404 enables the ingress line card to route around the failure quickly. Operation of the OPM 404 will be described in greater detail in a later section.

In performing its FRM functions, the OPM 404 utilizes the information stored in the routing table 422. In one embodiment, the routing table 422 takes the same form as the routing table 322 shown in FIG. 6. Basically, the routing table 422 provides the OPM 404 with the routes that it may use in sending information to any of the line cards 202 in the router 102. This routing information is used by the OPM 404 to send the route failure messages discussed above to the ingress line cards 202. As was the case with the routing tables 322 of the line cards 202, the routing table 422 of the fabric card 206 is unique to each fabric card 206. Thus, each fabric card 206 will have a different routing table 422 stored thereon.

To couple the fabric card 206 to the switching fabric 204 and to the line cards 202, there is provided SFM 408. In one embodiment, SFM 408 takes the same form as the SFM 308 of the line cards 202 (i.e. is a multi-port switch). A plurality of the ports of the SFM 408 are coupled to the OPM 404, while the reminder of the ports are coupled to the switching fabric 204 and the line cards 202. In one embodiment, the switching fabric 204 of the router 102 is formed by interconnecting the SFM's 408 of the various fabric cards 206. More specifically, various ports of the SFM 408 of each fabric card 206 are coupled to various ports of the SFM 408 of other fabric cards 206. Since, in one embodiment, the SFM 408 is a multi-port switch, this interconnection of the SFM's 408 forms the mesh that constitutes the switching fabric 204 of the router 102.

In addition to being coupled to each other, the SFM's 408 of at least some of the fabric cards 206 are also coupled to the SFM's 308 of one or more of the line cards 202. These connections enable the line cards 202 to access the switching fabric 204. To maximize routing flexibility, each line card 202 in one embodiment is coupled to multiple fabric cards 206. That way, if a fabric card 206 fails, the line card 202 can still access the switching fabric 204 via another fabric card 206. Given such an interconnected mesh, any line card 202 may access any line card 202, and any failure may be routed around by simply following another route.

Normal Operation

Figure 9:
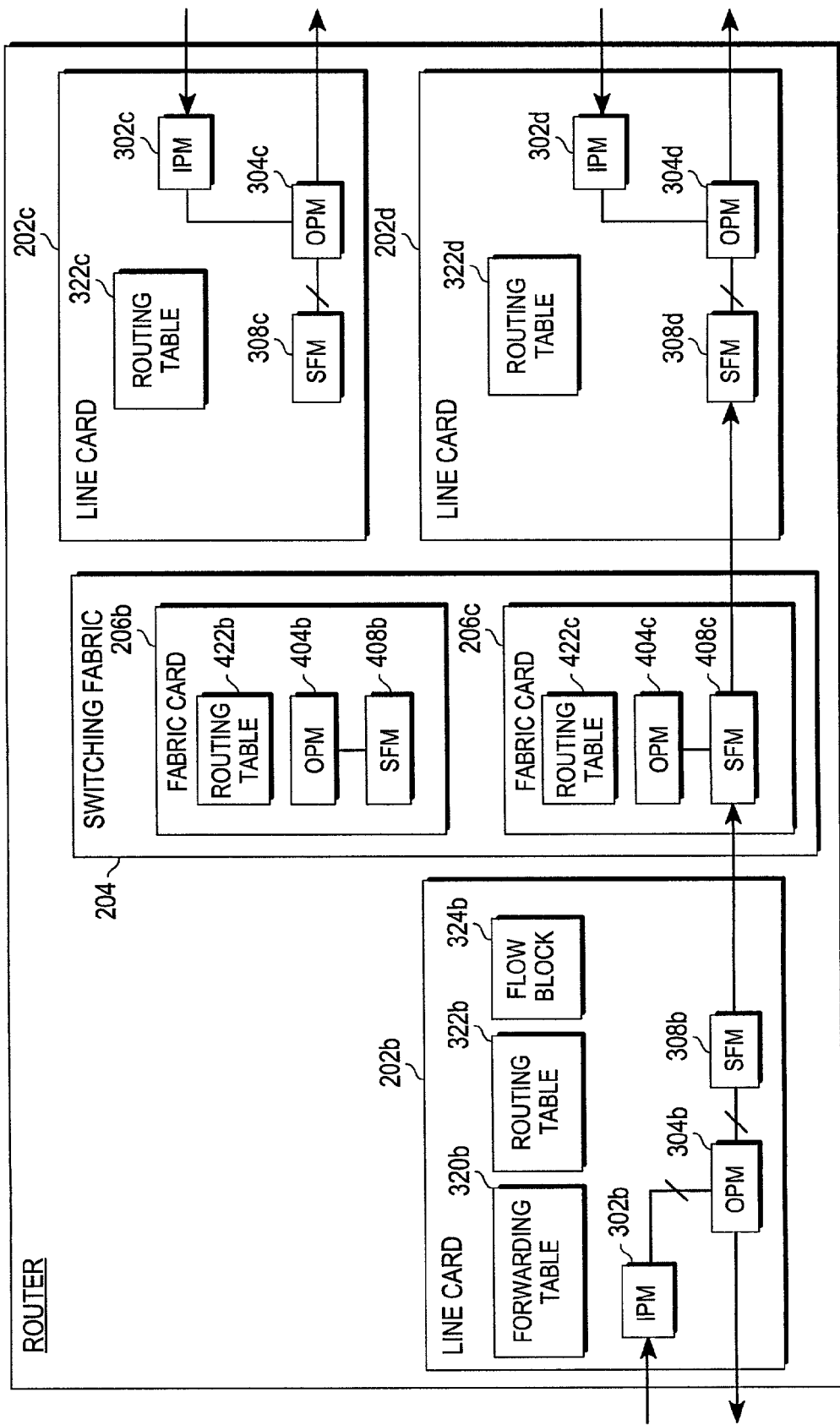
FIG. 9 shows one embodiment of the normal operational flow of the router of FIG. 2 when no failures occur.

With reference to FIG. 9, normal operation of the router 102 without any failures will now be described. To facilitate discussion, FIG. 9 provides an elaborated view of some of the router components shown in FIG. 2. In the following description, it will be assumed for illustrative purposes that line card 202b receives an incoming packet, and hence, acts as the ingress line card.

When an incoming packet is initially received by the IPM 302b of the ingress line card 202b, the packet comprises basic information, including for example: (1) a destination IP address to which the packet is to be routed; (2) data; and (3) a flow label if the packet is part of a flow. Using this information, the IPM 302b prepares the packet for routing through the router 102.

In one embodiment, the IPM 302b initially determines whether the packet contains a flow label. If so, the IPM 302b determines whether a flow block associated with the flow label already exists. If an associated flow block 324b already exists, then the IPM 302b extracts from that flow block 324b all of the information that it uses to determine the egress line card to which the packet is to be routed. Specifically, based upon the value of the Alt field 706 (see FIG. 7) in the flow block 324b, the IPM 302b determines whether the packet should be routed to the egress line card identified in the EC field 702 or the alternate egress line card identified in the AEC field 704. For a packet that is part of an already existing flow, the IPM 302b does not consult the forwarding table 320b.

If the packet is not part of an existing flow, thereby meaning that it is the first packet of a new flow, the IPM 302b performs some additional operations. In one embodiment, the IPM 302b extracts the destination IP address from the packet. Using this IP address, the IPM 302b consults the forwarding table 320b (see FIG. 5), and obtains therefrom the identifiers of a primary egress line card and an alternate egress line card. Then, the IPM 302b creates a new flow block 324b, assigns the new flow block 324b a new flow label, and populates it with the information from the forwarding table 320b. Specifically, the IPM 302b stores the identifier of the primary egress line card into the EC field 702 (FIG. 7) of the flow block 324b, and stores the identifier of the alternate egress line card into the AEC field 704. In addition, the IPM 302b sets the value of the Alt field 706 to 0 to indicate that packets of the flow should be routed to the primary egress line card. Furthermore, the IPM 302b stores a value between 0 and 16 into the RT field 708. This value may be a default value (e.g. 0). The IPM 302b may further store additional information into the Other field 710. Once that is done, the new flow block 324b is created and populated.

Figure 8:
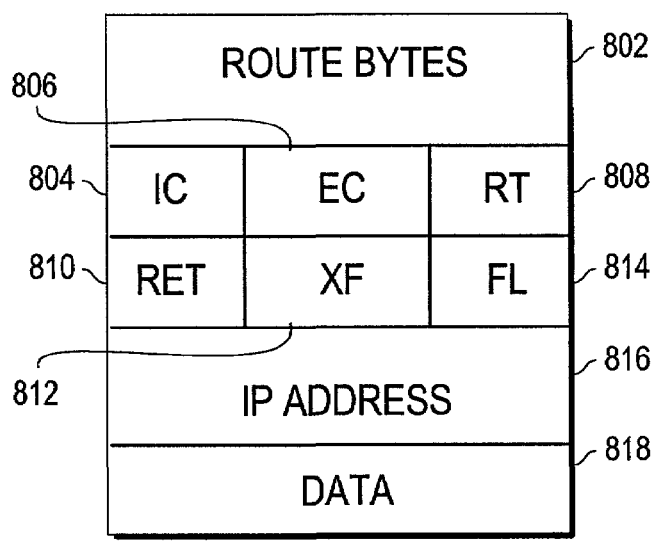
FIG. 8 shows one possible embodiment of an augmented packet in accordance with one embodiment of the present invention.

As described above, the IPM 302b determines the egress line card by consulting either the flow block 324b or the forwarding table 320b. For the sake of illustration, it will be assumed that the packet is to be routed to the primary egress line card, and that the primary egress line card is line card 202d. Once the egress line card is ascertained, the IPM 302b proceeds to prepare the packet for routing through the router 102. In one embodiment, the packet is prepared by augmenting it with additional information. One possible embodiment of the augmented packet is shown in FIG. 8. As shown, the augmented packet 800 comprises an IP address field 816 for holding the destination IP address of the packet, and a data field 818 for holding the data of the packet. In addition, the augmented packet 800 further comprises a route bytes field 802 for holding a set of route bytes, an IC field 804 for holding the identifier of the ingress line card, an EC field 806 for holding the identifier of the egress line card to which the packet is to be routed, an RT field 808 for holding a value between 0 and 15, an RET field 810 for holding a flag which indicates whether the packet 800 is a returned packet, an XF field 812 for holding a flag which indicates whether the packet 800 was undeliverable because of an external failure, and an FL field 813 for holding a flow label.

In preparing the packet for routing, the IPM 302b stores certain information into the augmented packet 800. Specifically, the IPM 302b: (1) stores the identifier of the ingress line card 202b into the IC field 804; (2) stores the identifier of the egress line card 202d into the EC field 806; (3) stores the value in the RT field 710 of the flow block 324b (FIG. 7) into the RT field 808; (4) sets the value of the RET flag 810 to 0 to indicate that the packet 800 is not a returned packet; (5) sets the value of the XF flag 812 to 0 to indicate that the packet 800 has not encountered an external failure; (6) stores the flow label of the flow (whether existing or newly created) into the FL field 814; (7) stores the destination IP address into the IP address field 816; and (8) stores the data of the packet into the data field 818. In one embodiment, the IPM 302b does not store any information into the route bytes field 802. After the IPM 302b populates the augmented packet 800 as described above, it forwards the packet 800 to the OPM 304b for further processing.

Upon receiving the augmented packet 800, the OPM 304b determines an internal route that can be taken to deliver the packet 800 to the egress line card 202d. In one embodiment, the OPM 304b makes this determination by extracting the egress line card identifier from the EC field 806, and the RT value from the RT field 808. Using these sets of information, the OPM 304b accesses a particular entry in the routing table 322b (see FIG. 6), and obtains therefrom a set of route bytes, which specify a specific path from the ingress line card 202b to the egress line card 202d. The OPM 304b thereafter stores the route bytes into the route bytes field 802 of the augmented packet 800, and forwards the packet 800 to the SFM 308b for routing to the egress line card 202d.

In one embodiment, as the packet 800 makes its way through the SFM 308b of ingress line card 202b, the SFM 408c of fabric card 206c, and the SFM 308d of egress line card 202d, the route bytes in field 802 are consumed. More specifically, in determining how to switch the packet 800, each SFM 308, 408 consumes one of the route bytes. As discussed above, a route byte tells an SFM 308, 408 which port should be the output port, and hence, how the packet should be switched. Since each SFM 308, 408 consumes one route byte, by the time the packet 800 reaches the OPM 304d of the egress line card 202d, the packet 800 will have no more route bytes in field 802.

Upon receiving the packet 800, the OPM 304d of the egress line card 202d processes the packet 800 to prepare it for transmission to another router. In one embodiment, this processing comprises removing some or all of the augmented fields 802-814 from the packet 800. The amount of processing required may differ depending, for example, upon the type of router to which the OPM 304d is coupled. Once the packet is properly processed, it is forwarded by the OPM 304d to an external router via the outgoing trunk coupled to the egress line card 202d. In the manner described, a packet is properly routed through the router 102.

The above description of the operation of the router 102 applies when no failures are encountered. If a failure is encountered, additional and different operations may need to be performed. In router 102, there are generally three areas in which a failure might occur. A first area is between the ingress line card 202b and the egress line card 202d. Failures in this area (referred to herein as internal failures) may include a link failure between the fabric card 206c and the egress line card 202d, a fabric card 206c failure, and a link failure between the ingress line card 202b and the fabric card 206c. A second area in which failure might occur is the area external to the egress line card 202d. For example, the trunk to which the egress line card 202d is coupled may be down, or the external router to which the trunk is coupled may be disabled. A third area is at the egress line card 202d itself. The egress line card 202d may be disabled (e.g. the line card 202d may be accidentally unplugged from the router 102). In one embodiment, a slightly different FRM is implemented for failures in each of these areas. Thus, failure recovery in each area will be discussed separately.

Failure Recovery

Failure Between Ingress and Egress Line Card

Figure 10:
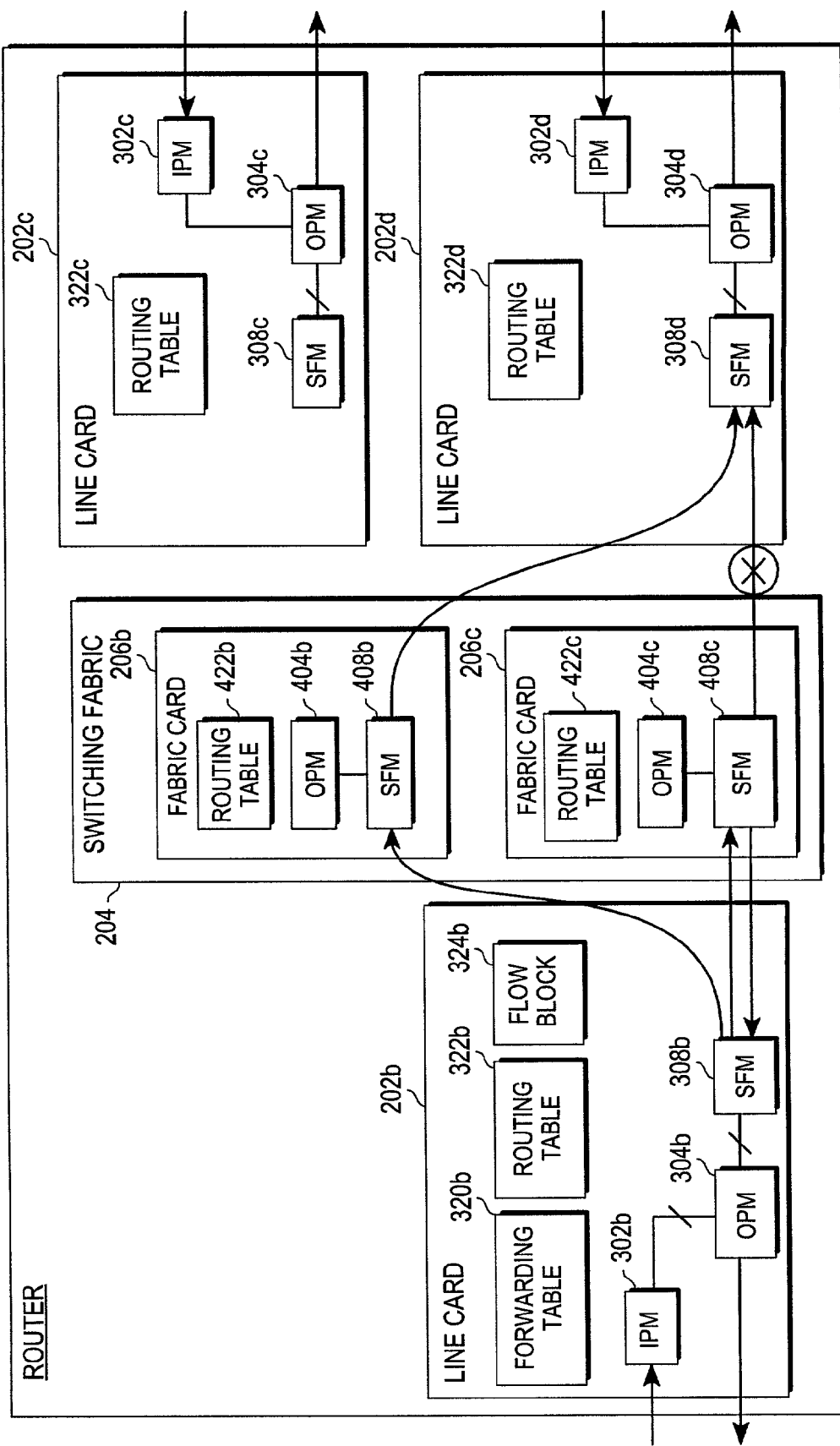
FIG. 10 shows one embodiment of the operational flow of the router of FIG. 2 when a link failure occurs between a fabric card and an egress line card.

With reference to FIG. 10, there is shown one embodiment of the operational flow of the router 102 when a link failure occurs between the fabric card 206c and the egress line card 202d. In this operational flow, it is assumed that the incoming packet is processed by the IPM 302b and the OPM 304b of the ingress line card 202b in the same manner as that described above in the normal operation of the router 102. It is also assumed that the augmented packet 800 makes its way through the SFM 308b of the ingress line card 202b to the SFM 408c of the fabric card 206c.

When the SFM 408c of the fabric card 206c receives the packet 800, it tries to switch the packet 800 to the SFM 308d of the egress line card 202d via the link specified by the consumed route byte. However, when the SFM 408c senses that that link has failed, it forwards the packet 800 to the OPM 404c of the fabric card 206c instead of sending the packet to the failed link.

Upon receiving the forwarded packet 800, the OPM 404c prepares the packet 800 for resending back to the ingress line card 202b. In one embodiment, the OPM 404c prepares the packet 800 by setting the RET flag 810 (see FIG. 8) of the packet 800 to 1 to indicate that the packet 800 is a returned packet. In effect, the RET flag 810 acts as a message to the ingress line card 202b that the route it selected previously has failed. In addition to setting the RET flag 810, the OPM 404c also determines a route back to the ingress line card 202b. In one embodiment, the OPM 404c determines a route by extracting the identifier of the ingress line card 202b from the IC field 804 of the packet 800, and using the identifier to consult the routing table 422c. In one embodiment, the routing table 422c comprises multiple possible routes to the ingress line card 202b. The OPM 404c selects one of the routes (e.g. route 0 or route 1) and obtains a set of route bytes therefrom. After the route bytes are obtained, the OPM 404c clears out the route bytes field 802 of the packet 800, and stores the route bytes obtained from the routing table 422c into that field 802. The packet 800 is thereafter ready to be sent back to the ingress line card 202b. Accordingly, the OPM 404c forwards the packet 800 to the SFM 408c. In turn, the SFM 408c switches the packet 800 to SFM 308b, which forwards the packet 800 to the OPM 304b of the ingress line card 202b.

When the OPM 304b of the ingress line card 202b receives the packet 800, it ascertains from the RET field 810 that the packet 800 is a returned packet, thereby meaning that the route it previously selected failed. In response to this information, the OPM 304b prepares the returned packet for resending to the egress line card 202d. In one embodiment, the OPM 304b prepares the packet by resetting the RET field 810 to 0. In addition, the OPM 304b determines an alternate route to the egress line card 202d. In one embodiment, the OPM 304b determines an alternate route by incrementing the value in the RT field 808, and then using the incremented RT value and the egress line card identifier in the EC field 806 to access a particular entry in the routing table 322b. This has the effect of accessing the next available route to the egress line card 202d. For example, if the previous route was route 0, then the alternate route is route 1. As noted previously, successive routes in the routing table 322b are diverse. This means that the alternate route and the previous route have very few components in common. Thus, the probability that the alternate route will encounter the same failure as the previous route is remote.

From the accessed entry in the routing table 322b, the OPM 304b obtains a new set of route bytes, which define an alternate path to the egress line card 202d. After the route bytes are obtained, the OPM 304b clears out the route bytes field 802 of the packet 800, and stores the new route bytes into that field 802. The packet 800 is thereafter ready to be resent to the egress line card 202d. To resend the packet 800, the OPM 304b forwards the packet 800 to the SFM 308b. Assuming that the alternate route is that shown in FIG. 10, the SFM 308b in turn switches the packet 800 to SFM 408b of fabric card 206b, which in turn switches the packet 800 to SFM 308d of the egress line card 202d, which forwards the packet 800 to the OPM 304d of the egress line card 202d. In response, the OPM 304d processes the packet 800, as necessary, and sends it onto the external router via the attached trunk. The packet 800 is thus successfully routed through the router 102 despite the internal link failure.

The above process takes care of packets that encounter the internal link failure while they are en route. To prevent future packets from being sent onto the failed route at all, the OPM 304b of the ingress line card 202b updates the routing table 322b. In one embodiment, the routing table 322b is updated by overwriting the route bytes in the failed route with the route bytes of the alternate route. For example, if route 0 is the failed route and route 1 is the alternate route, then the route bytes associated with route 0 are overwritten with the route bytes of route 1. That way, even if a packet does use route 0 in the future, it will travel along the alternate route rather than the route that has the failure. By preventing future use of the failed route, recovery from the failure is complete.

Figure 11:
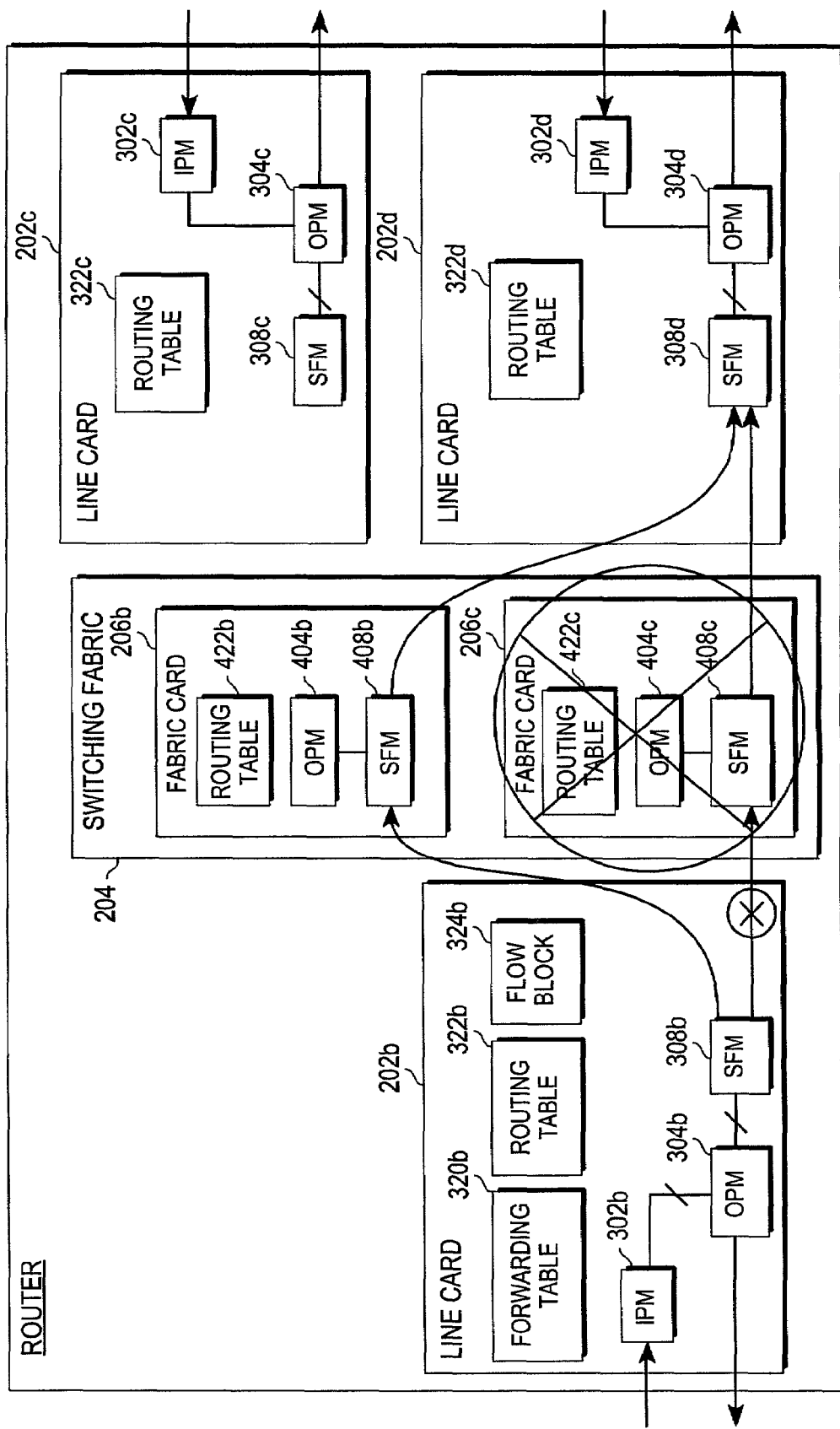
FIG. 11 shows one embodiment of the operational flow of the router of FIG. 2 when a failure occurs either between an ingress line card and a fabric card, or at the fabric card.

With reference to FIG. 11, there is shown one embodiment of the operational flow of the router 102 when a link failure occurs either between the ingress line card 202b and the fabric card 206c, or at the fabric card 206c itself. In this operational flow, it is assumed that the incoming packet is processed by the IPM 302b and the OPM 304b of the ingress line card 202b in the same manner as that described above in the normal operation of the router 102. It is also assumed that the augmented packet 800 makes its way to the SFM 308*b* of the ingress line card 202*b*.

When the SFM 308*b* of the ingress line card 202*b* receives the packet 800, it tries to switch the packet 800 to the SFM 408*c* of the fabric card 206*c* via the link specified by the consumed route byte. However, due to either a failure of the specified link or a failure of the entire fabric card 206*c*, the SFM 308*b* detects that it cannot send the packet 800 further along its current route. In response to this failure detection, the SFM 308*b* returns the packet 800 to the OPM 304*b* of the ingress line card 202*b* instead of sending it on to the failed route. In one embodiment, the packet 800 is returned via a special port so that the OPM 304*b* knows that a route failure has occurred.

Upon receiving the returned packet, the OPM 304*b* prepares the packet for resending to the egress line card 202*d* along an alternate route. In one embodiment, the OPM 304*b* determines an alternate route by incrementing the value in the RT field 808 of the packet 800, and then using the incremented RT value and the egress line card identifier in the EC field 806 to access a particular entry in the routing table 322*b*. As noted previously, this has the effect of accessing the next available route to the egress line card 202*d*. Once the proper entry of the routing table 322*b* is accessed, the OPM 304*b* obtains therefrom a new set of route bytes, which define an alternate path to the egress line card 202*d*. After the route bytes are obtained, the OPM 304*b* clears out the route bytes field 802 of the packet 800, and stores the new route bytes into that field 802. The packet 800 is thus ready to be resent to the egress line card 202*d*.

To resend the packet 800, the OPM 304*b* forwards the packet 800 to the SFM 308*b*. Assuming that the alternate route is that shown in FIG. 11, the SFM 308*b* in turn switches the packet 800 to SFM 408*b* of fabric card 206*b*, which in turn switches the packet 800 to SFM 308*d* of the egress line card 202*d*, which forwards the packet 800 to the OPM 304*d* of the egress line card 202*d*. In response, the OPM 304*d* processes the packet 800, as necessary, and sends it on to the external router via the attached trunk. The packet 800 is thus successfully routed through the router 102 despite the internal link or fabric card failure.

The above process takes care of packets that encounter the internal link failure while they are en route. To prevent future packets from being sent onto the failed route at all, the OPM 304*b* of the ingress line card 202*b* updates the routing table 322*b*. In one embodiment, the routing table 322*b* is updated by overwriting the route bytes in the failed route with the route bytes of the alternate route. For example, if route 0 is the failed route and route 1 is the alternate route, then the route bytes associated with route 0 are overwritten with the route bytes of route 1. That way, even if a packet does use route 0 in the future, it will travel along the alternate route rather than the route that has the failure. By preventing future use of the failed route, recovery from the failure is complete.

Failure Recovery

External Failure

Figure 12:
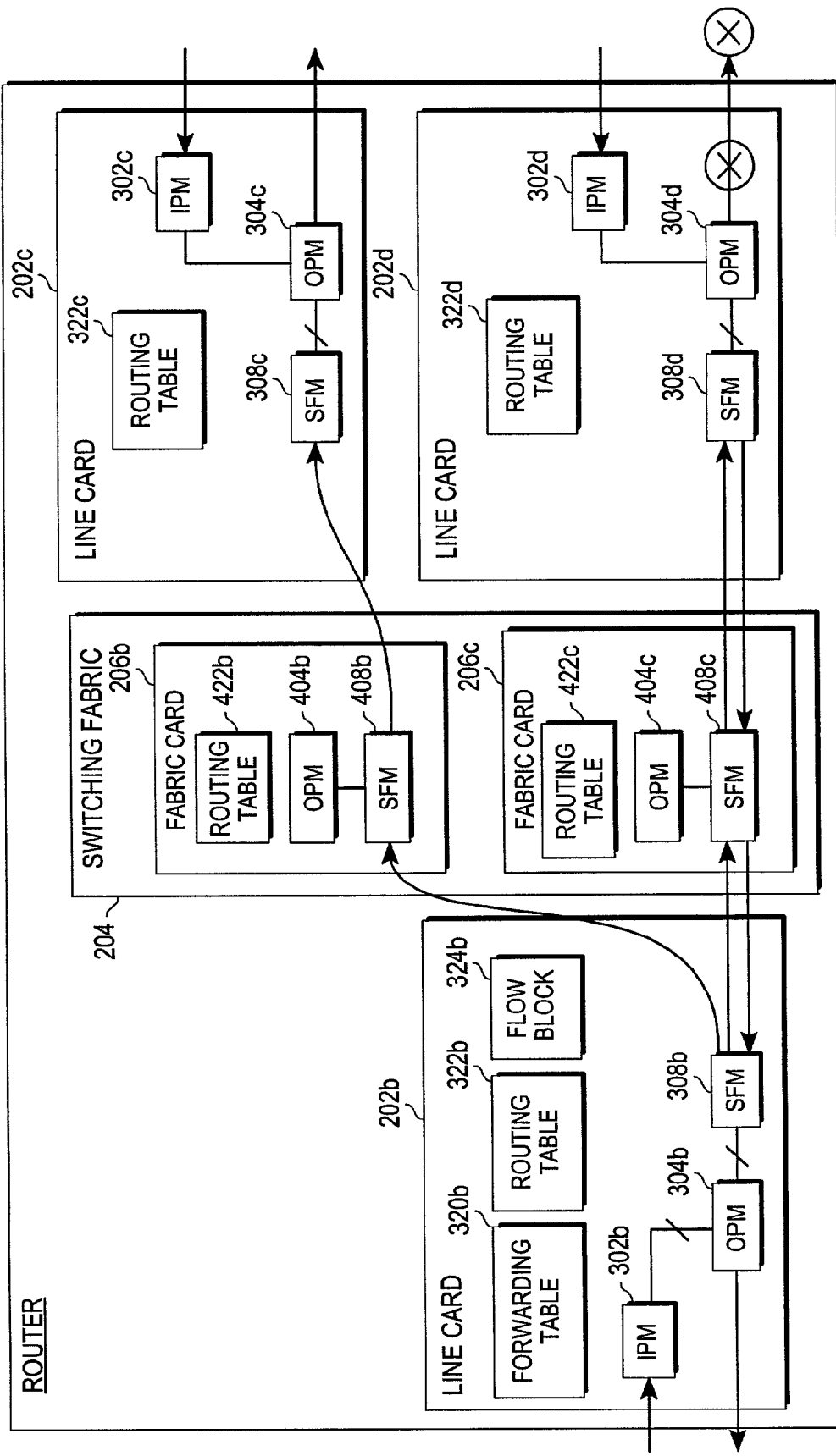
FIG. 12 shows one embodiment of the operational flow of the router of FIG. 2 when an external failure occurs.

With reference to FIG. 12, there is shown one embodiment of the operational flow of the router 102 when an external failure occurs. Examples of an external failure include, but are not limited to, a downed trunk coupled to the egress line card 202*d* and a disabled router adjacent to the egress line card 202*d*. In the operational flow of FIG. 12, it is assumed that the incoming packet is processed by the IPM 302*b* and the OPM 304*b* of the ingress line card 202*b* in the same manner as that described above in the normal operation of the router 102. It is also assumed that the augmented packet 800 makes its way through SFM 308*b*, SFM 408*c*, and SFM 308*d*, and arrives at the OPM 304*d* of the egress line card 202*d*.

Typically, when a packet 800 is received by the OPM 304*d* of the egress line card 202*d*, the OPM 304*d* processes the packet 800 to prepare it for transmission to the adjacent external router via the attached trunk. In this example, however, the OPM 304*d* detects that an external failure has occurred. This failure may be detected in many ways. For example, the OPM 304*d* may receive a failure message from the physical transport layer of the network 100. In addition, the OPM 304*d* may determine that an active signal has not be received from the adjacent router in a certain period of time, and hence, concludes that the adjacent router is disabled. However the failure is detected, once the OPM 304*d* is made aware of the failure, it knows that it should not forward packets to the failed component. Thus, rather than sending the packet 800 onto the trunk as usual, the OPM 304*d* prepares the packet 800 to be resent back to the ingress line card 202*b*.

In one embodiment, the OPM 304*d* prepares the packet 800 by setting the RET flag 810 (see FIG. 8) of the packet 800 to 1 to indicate that the packet 800 is a returned packet. In effect, the RET flag 810 acts as a message to the ingress line card 202*b* that the route it selected previously has failed. In addition, the OPM 304*d* sets the XF flag 812 to 1. This indicates to the ingress line card 202*b* that an external rather than an internal failure has occurred.

In addition to setting the RET flag 810 and the XF flag 812, the OPM 304*d* also determines a route back to the ingress line card 202*b*. In one embodiment, the OPM 304*d* determines a route by extracting the identifier of the ingress line card 202*b* from the IC field 804 of the packet 800, and using the identifier to consult the routing table 322*d*. In one embodiment, the routing table 322*d* comprises multiple possible routes to the ingress line card 202*b*. The OPM 304*d* selects one of the routes (e.g. route 0 or route 1) and obtains a set of route bytes therefrom. After the route bytes are obtained, the OPM 304*d* clears out the route bytes field 802 of the packet 800, and stores the route bytes obtained from the routing table 322*d* into that field 802. The packet 800 is thereafter ready to be sent back to the ingress line card 202*b*. Accordingly, the OPM 304*d* forwards the packet 800 to the SFM 308*d* for routing back to the OPM 304*b* of the ingress line card 202*b*. In the example shown in FIG. 12, the route back to OPM 304*b* passes through SFM 408*c* and SFM 308*b*.

When the OPM 304*b* of the ingress line card 202*b* receives the packet 800, it ascertains from the RET field 810 that the packet 800 is a returned packet, meaning that the route it previously selected failed. In addition, it ascertains from the XF field 812 that the failure was an external failure. Given that the failure was an external failure, resending the packet 800 to the same egress line card 202*d* via an alternate internal route will not route around the failure. Instead, it may be desirable to send the returned packet 800 to an alternate egress line card. In one embodiment, this is the course of action that the OPM 304*b* takes.

To determine an alternate egress line card to which to send the packet, the OPM 304*b* enlists the aid of the IPM 302*b*. More specifically, the OPM 304*b* extracts the flow label stored in the FL field 814 of the packet 800, and provides it to the IPM 302*b*. In turn, the IPM 302*b* uses the flow label to access the appropriate flow block 324*b*. From the flow block 324*b*, the IPM 302*b* extracts the identifier of an alternate egress line card from the AEC field 704 (see FIG. 7). For illustrative purposes, it will be assumed that the alternate egress line card is line card 202c. The identifier of the alternate egress line card 202c is returned to the OPM 304b. In addition, the IPM 302b sets the Alt flag 706 to 1. As noted previously, setting the Alt flag 706 to 1 causes all packets of the flow to be routed to the alternate egress line card. Thus, by setting the Alt flag 706, the IPM 302b: (1) prevents future packets of the flow from being routed to the primary egress line card 202d; and (2) causes future packets of the flow to be routed to the alternate egress line card 202c.

After the OPM 304b obtains the identifier of the alternate egress line card 202c from the IPM 302b, the OPM 304b prepares the returned packet for sending to the alternate egress line card 202c. In one embodiment, the OPM 304b prepares the packet by resetting the RET flag 810 and the XF flag 812 to 0. Also, the OPM 304b stores the identifier of the alternate egress line card 202c into the EC field 806 of the packet 800. In addition, the OPM 304b determines a route to the alternate egress line card 202c. In one embodiment, the OPM 304b determines a route by using the RT value in the RT field 808 and the alternate egress line card identifier in the EC field 806 to access a particular entry in the routing table 322b. From the accessed entry, the OPM 304b obtains a set of route bytes, which define a path to the alternate egress line card 202c. After the route bytes are obtained, the OPM 304b clears out the route bytes field 802 of the packet 800, and stores the route bytes obtained from the routing table 322b into that field 802. The packet 800 is thereafter ready to be sent to the alternate egress line card 202c.

To send the packet 800, the OPM 304b forwards the packet 800 to the SFM 308b. Assuming that the route to the alternate egress line card 202c is that shown in FIG. 12, the SFM 308b in turn switches the packet 800 to SFM 408b of fabric card 206b, which in turn switches the packet 800 to SFM 308c of the alternate egress line card 202c, which forwards the packet 800 to the OPM 304c of the alternate egress line card 202c. In response, the OPM 304c processes the packet 800, as necessary, and sends it on to an external router via the attached trunk. The packet 800 is thus successfully routed to its destination IP address despite the external failure.

Failure Recovery

Failure of Egress Line Card

Figure 13:
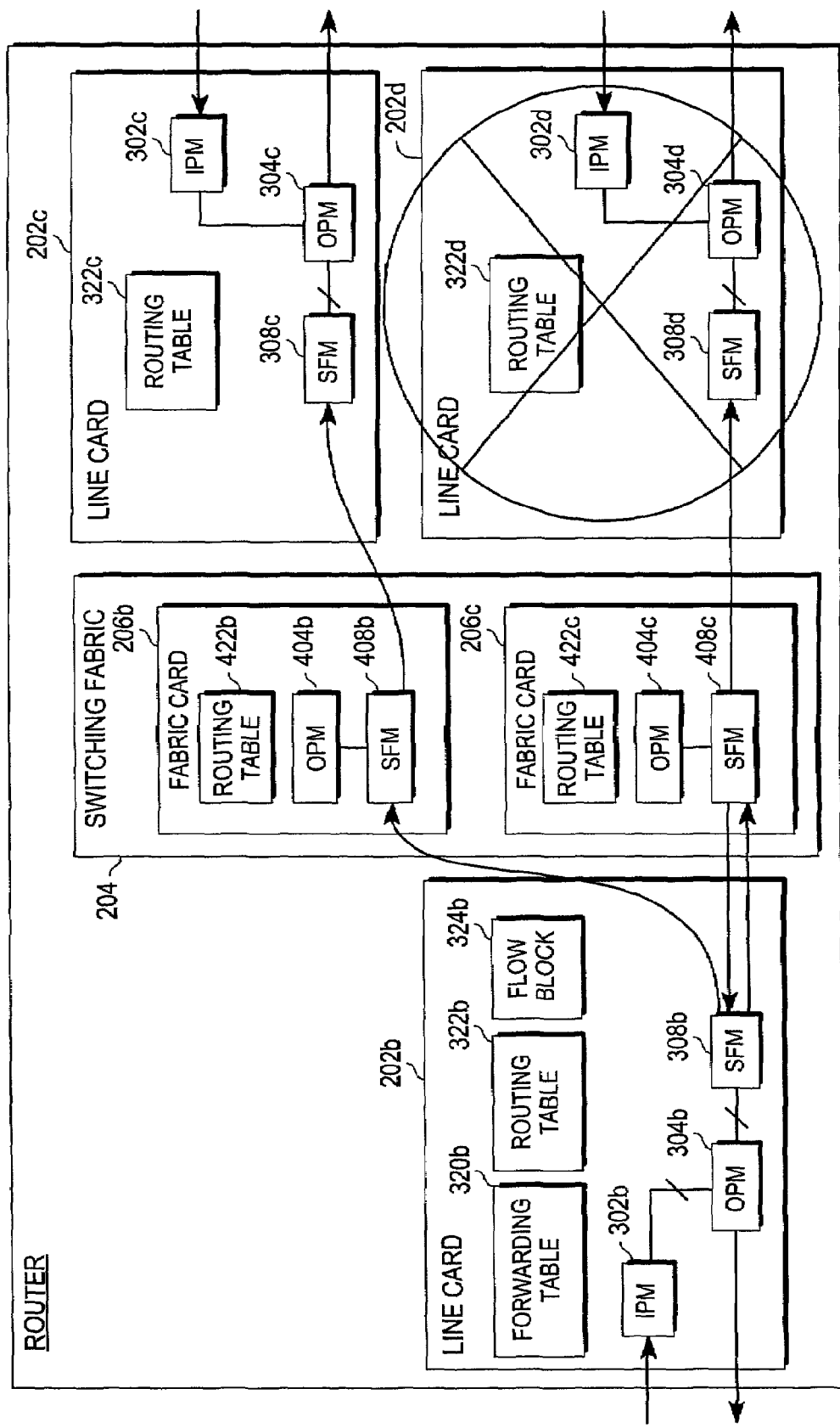
FIG. 13 shows one embodiment of the operational flow of the router of FIG. 2 when an egress line card failure occurs.

With reference to FIG. 13, there is shown one embodiment of the operational flow of the router 102 when a failure of the primary egress line card 202d occurs. In the operational flow of FIG. 13, it is assumed that the incoming packet is processed by the IPM 302b and the OPM 304b of the ingress line card 202b in the same manner as that described above in the normal operation of the router 102. It is also assumed that the augmented packet 800 makes its way through the SFM 308b of the ingress line card 202b and arrives at the SFM 408c of the fabric card 206c.

When the SFM 408c of the fabric card 206c receives the packet 800, it tries to switch the packet 800 to the SFM 308d of the egress line card 202d via the link specified by the consumed route byte. However, when the SFM 408c senses that that link has failed, it forwards the packet 800 to the OPM 404c of the fabric card 206c instead of sending the packet to the failed link.

Upon receiving the forwarded packet 800, the OPM 404c prepares the packet 800 for resending back to the ingress line card 202b. In one embodiment, the OPM 404c prepares the packet 800 by setting the RET flag 810 (see FIG. 8) of the packet 800 to 1 to indicate that the packet 800 is a returned packet. In effect, the RET flag 810 acts as a message to the ingress line card 202b that the route it selected previously has failed. In addition, because the OPM 404c detects that the entire egress line card 202d has failed, it sets the XF flag 812 to 1 (in one embodiment, an egress line card failure is treated like an external failure). The OPM 404c may detect the failure of the egress line card 202d in many ways. One way is to determine that the egress line card 202d has not provided an active signal within a certain period of time.

In addition to setting the RET flag 810 and the XF flag 812, the OPM 404c also determines a route back to the ingress line card 202b. In one embodiment, the OPM 404c determines a route by extracting the identifier of the ingress line card 202b from the IC field 804 of the packet 800, and using the identifier to consult the routing table 422c. In one embodiment, the routing table 422c comprises multiple possible routes to the ingress line card 202b. The OPM 404c selects one of the routes (e.g. route 0 or route 1) and obtains a set of route bytes therefrom. After the route bytes are obtained, the OPM 404c clears out the route bytes field 802 of the packet 800, and stores the route bytes obtained from the routing table 422c into that field 802. The packet 800 is thereafter ready to be sent back to the ingress line card 202b. Accordingly, the OPM 404c forwards the packet 800 to the SFM 408c. In turn, the SFM 408c switches the packet 800 to SFM 308b, which forwards the packet 800 to the OPM 304b of the ingress line card 202b.

When the OPM 304b of the ingress line card 202b receives the packet 800, it ascertains from the RET field 810 that the packet 800 is a returned packet, meaning that the route it previously selected failed. In addition, it ascertains from the XF field 812 that the failure was an external failure (or an egress line card failure). Given this type of failure, the OPM 304b in one embodiment does not resend the packet 800 to the same egress line card 202d via an alternate internal route. Instead, it sends the returned packet 800 to an alternate egress line card.

To determine an alternate egress line card to which to send the packet, the OPM 304b enlists the aid of the IPM 302b. More specifically, the OPM 304b extracts the flow label stored in the FL field 814 of the packet 800, and provides it to the IPM 302b. In turn, the IPM 302b uses the flow label to access the appropriate flow block 324b. From the flow block 324b, the IPM 302b extracts the identifier of an alternate egress line card from the AEC field 704 (see FIG. 7). For illustrative purposes, it will be assumed that the alternate egress line card is line card 202c. The identifier of the alternate egress line card 202c is returned to the OPM 304b. In addition, the IPM 302b sets the Alt flag 706 to 1. By doing so, the IPM 302b: (1) prevents future packets of the flow from being routed to the primary egress line card 202d; and (2) causes future packets of the flow to be routed to the alternate egress line card 202c.

After the OPM 304b obtains the identifier of the alternate egress line card 202c from the IPM 302b, the OPM 304b prepares the returned packet for sending to the alternate egress line card 202c. In one embodiment, the OPM 304b prepares the packet by resetting the RET flag 810 and the XF flag 812 to 0. Also, the OPM 304b stores the identifier of the alternate egress line card 202c into the EC field 806 of the packet 800. In addition, the OPM 304b determines a route to the alternate egress line card 202c. In one embodiment, the OPM 304b determines a route by using the RT value in the RT field 808 and the alternate egress line card identifier in the EC field 806 to access a particular entry in the routing table 322b. From the accessed entry, the OPM 304b obtains a set of route bytes, which define a path to the alternate egress line card 202c. After the route bytes are obtained, the OPM 304b clears out the route bytes field 802 of the packet 800, and stores the route bytes obtained from the routing table 322b into that field 802. The packet 800 is thereafter ready to be sent to the alternate egress line card 202c.

To send the packet 800, the OPM 304b forwards the packet 800 to the SFM 308b. Assuming that the route to the alternate egress line card 202c is that shown in FIG. 13, the SFM 308b in turn switches the packet 800 to SFM 408b of fabric card 206b, which in turn switches the packet 800 to SFM 308c of the alternate egress line card 202c, which forwards the packet 800 to the OPM 304c of the alternate egress line card 202c. In response, the OPM 304c processes the packet 800, as necessary, and sends it on to an external router via the attached trunk. The packet 800 is thus successfully routed to its destination IP address despite the egress line card failure.

In the embodiment just described, it is the OPM 404c of the fabric card 206c that detects the failure of the egress line card 202d. As an alternative, the failure of the egress line card 202d may be detected by the OPM 304b of the ingress line card 202b. In one embodiment, the OPM 304b may detect failure of the egress line card 202d by determining how many times a particular packet has been returned. If the number of times a particular packet has been returned reaches a certain threshold, then the OPM 304b can conclude that it is the egress line card 202d, not the switching fabric 204, that has failed. Since it is the egress line card 202d that has failed, the OPM 304b does not try to resend the returned packet to the egress line card 202d. Instead, the OPM 304b reroutes the returned packet and future packets to the alternate egress line card 202c. This reroute may be carried out in the same manner as that described above.

To enable the OPM 304b of the ingress line card 202b to detect failure of the egress line card 202d in this way, a return count (RC) field (not shown) may be added to the packet 800 of FIG. 8 to maintain a count of how many times a packet has been returned to the ingress line card 202b. Each time an OPM (such as OPM 404c) returns a packet to the ingress line card 202b, the value in the RC field is incremented. When the OPM 304b of the ingress line card 202b receives the returned packet, the OPM 304b checks the value of the RC field to determine whether it has reached the threshold. If the RC value has reached the threshold, then the OPM 304b can conclude that the egress line card 202d has failed. Hence, the OPM 304b reroutes the returned packet and future packets to the alternate egress line card 202c. In this and other ways, failure of the egress line card 202d can be detected.

At this point, it should be noted that although the invention has been described with reference to one or more specific embodiments, it should not be construed to be so limited. Various modifications may be made by those of ordinary skill in the art with the benefit of this disclosure without departing from the spirit of the invention. For example, each line card 202 (FIG. 2) has been described thus far as comprising an IPM 302 and an OPM 304. Rather than having separate components, if so desired, the functionality of the IPM 302 and OPM 304 may be embodied in a single component. Alternatively, the functionality of the IPM 302 and OPM 304 may be split out into multiple IPM's and OPM's. These and other implementations of the IPM and OPM functionality are within the scope of the present invention. Also, each line card 202 has been disclosed as comprising an SFM 308. While this is an advantageous embodiment, it should be noted that if so desired, the SFM 308 may be moved off of the line card 202 into the switching fabric 204. This and other arrangements are possible. Furthermore, each fabric card 206 (FIG. 4) has been described as comprising an OPM 404 and an SFM 408. Rather than having separate components, if so desired, the functionality of the OPM 404 and SFM 408 may be embodied in a single component. Alternatively, the functionality of the OPM 404 and SFM 408 may be split out into multiple OPM's and SFM's. As a further alternative, the functionality of the OPM 404 may be moved off of the fabric card 206 and placed in one or more portions of the switching fabric 204. These and other implementations of the fabric card 206 and switching fabric 204 are possible. From this discussion, it is clear that many modifications may be made to the embodiments that have been described without departing from the spirit of the invention. Thus, the invention should not be limited by the specific embodiments used to illustrate it but only by the scope of the appended claims.

What is claimed is:

1. A method, implemented within a router of a network, for recovering from a failure, comprising:
sending, via a first route, a first set of information from an ingress module to a first egress module for forwarding by said first egress module to a destination external to said router, wherein said first set of information traverses a path which encompasses at least a portion of said first route;
detecting a failure of said first egress module;
in response to said failure of said first egress module, directing a message to said ingress module informing said ingress module of said first egress module failure;
in response to said message, selecting an alternate egress module capable of forwarding information to said destination;
sending, via a second route, a future set of information from said ingress module to said alternate egress module for forwarding to said destination, wherein said first set of information and said future set of information are both part of a flow; and
in response to said message, preventing other sets of information associated with said flow from being sent from said ingress module to said first egress module;
wherein directing said message to said ingress module comprises:
identifying said ingress module;
accessing a routing table which comprises one or more routes to said ingress module;
obtaining a return route from said routing table, wherein said return route directs said message to said ingress module along a different path than that traversed by said first set of information; and
sending said message to said ingress module via said return route; and
wherein said first egress module and said alternate egress module are predetermined, wherein identifiers associated with said first egress module and said alternate egress module are stored within a flow block associated with said flow, and wherein preventing comprises:
storing an indication in said flow block that all sets of information associated with said flow are not to be sent to said first egress module.

2. A method, implemented within a router of a network, for recovering from a failure, comprising:
sending, via a first route, a first set of information from an ingress module to a first egress module for forwarding by said first egress module to a destination external to said router, wherein said first set of information traverses a path which encompasses at least a portion of said first route;

detecting a failure of said first egress module;

in response to said failure of said first egress module, directing a message to said ingress module informing said ingress module of said first egress module failure;

in response to said message, selecting an alternate egress module capable of forwarding information to said destination;

sending, via a second route, a future set of information from said ingress module to said alternate egress module for forwarding to said destination, wherein said first set of information and said future set of information are both part of a flow; and in response to said message, causing other sets of information associated with said flow to be sent from said ingress module to said alternate egress module;

wherein directing said message to said ingress module comprises:

identifying said ingress module;

accessing a routing table which comprises one or more routes to said ingress module;

obtaining a return route from said routing table, wherein said return route directs said message to said ingress module along a different path than that traversed by said first set of information; and sending said message to said ingress module via said return route; and wherein said first egress module and said alternate egress module are predetermined, wherein identifiers associated with said first egress module and said alternate egress module are stored within a flow block associated with said flow, and wherein causing comprises:

storing an indication in said flow block that all sets of information associated with said flow are to be sent to said alternate egress module.

3. A method, implemented within a router of a network, for recovering from a failure, comprising:

sending, via a first route, a first set of information from an ingress module to a first egress module for forwarding by said first egress module to a destination external to said router, wherein said first set of information traverses a path which encompasses at least a portion of said first route;

detecting a failure of said first egress module;

in response to said failure of said first egress module, directing a message to said ingress module informing said ingress module of said first egress module failure;

in response to said message, selecting an alternate egress module capable of forwarding information to said destination; and sending, via a second route, a future set of information from said ingress module to said alternate egress module for forwarding to said destination;

wherein directing said message to said ingress module comprises:

identifying said ingress module;

accessing a routing table which comprises one or more routes to said ingress module;

obtaining a return route from said routing table, wherein said return route directs said message to said ingress module along a different path than that traversed by said first set of information; and sending said message to said ingress module via said return route; and wherein said first set of information and said future set of information are both part of a flow, wherein said first egress module and said alternate egress module are predetermined, wherein identifiers associated with said first egress module and said alternate egress module are stored within a flow block associated with said flow, and wherein selecting said alternate egress module comprises:

accessing said flow block to access the identifier associated with said alternate egress module.

4. A method, implemented within a router of a network, for recovering from a failure, comprising:

sending, via a first route, a first set of information from an ingress module to a first egress module for forwarding by said first egress module to a destination external to said router, wherein said first set of information traverses a path which encompasses at least a portion of said first route;

detecting an external failure beyond said first egress module;

in response to said external failure, directing a message to said ingress module informing said ingress module of said external failure;

in response to said message, selecting an alternate egress module capable of forwarding information to said destination;

sending, via a second route, a future set of information from said ingress module to said alternate egress module for forwarding to said destination, wherein said first set of information and said future set of information are both part of a flow; and in response to said message, preventing other sets of information associated with said flow from being sent from said ingress module to said first egress module;

wherein directing said message to said ingress module comprises:

identifying said ingress module;

accessing a routing table which comprises one or more routes to said ingress module;

obtaining a return route from said routing table, wherein said return route directs said message to said ingress module along a different path than that traversed by said first set of information; and sending said message to said ingress module via said return route; and wherein said first egress module and said alternate egress module are predetermined, wherein identifiers associated with said first egress module and said alternate egress module are stored within a flow block associated with said flow, and wherein preventing comprises:

storing an indication in said flow block that all sets of information associated with said flow are not to be sent to said first egress module.

5. A method, implemented within a router of a network, for recovering from a failure, comprising:

sending, via a first route, a first set of information from an ingress module to a first egress module for forwarding by said first egress module to a destination external to said router, wherein said first set of information traverses a path which encompasses at least a portion of said first route;

detecting an external failure beyond said first egress module;

in response to said external failure, directing a message to said ingress module informing said ingress module of said external failure;

in response to said message, selecting an alternate egress module capable of forwarding information to said destination;

sending, via a second route, a future set of information from said ingress module to said alternate egress module for forwarding to said destination, wherein said first set of information and said future set of information are both part of a flow; and in response to said message, causing other sets of information associated with said flow to be sent from said ingress module to said alternate egress module;

wherein directing said message to said ingress module comprises:

identifying said ingress module;

accessing a routing table which comprises one or more routes to said ingress module;

obtaining a return route from said routing table, wherein said return route directs said message to said ingress module along a different path than that traversed by said first set of information; and sending said message to said ingress module via said return route; and wherein said first egress module and said alternate egress module are predetermined, wherein identifiers associated with said first egress module and said alternate egress module are stored within a flow block associated with said flow, and wherein causing comprises:

storing an indication in said flow block that all sets of information associated with said flow are to be sent to said alternate egress module.

6. A method, implemented within a router of a network, for recovering from a failure, comprising:

sending, via a first route, a first set of information from an ingress module to a first egress module for forwarding by said first egress module to a destination external to said router, wherein said first set of information traverses a path which encompasses at least a portion of said first route;

detecting an external failure beyond said first egress module;

in response to said external failure, directing a message to said ingress module informing said ingress module of said external failure;

in response to said message, selecting an alternate egress module capable of forwarding information to said destination; and sending, via a second route, a future set of information from said ingress module to said alternate egress module for forwarding to said destination;

wherein directing said message to said ingress module comprises:

identifying said ingress module;

accessing a routing table which comprises one or more routes to said ingress module;

obtaining a return route from said routing table, wherein said return route directs said message to said ingress module along a different path than that traversed by said first set of information; and sending said message to said ingress module via said return route; and wherein said first set of information and said future set of information are both part of a flow, wherein said first egress module and said alternate egress module are predetermined, wherein identifiers associated with said first egress module and said alternate egress module are stored within a flow block associated with said flow, and wherein selecting said alternate egress module comprises:

accessing said flow block to access the identifier associated with said alternate egress module.

7. A router, comprising:

an ingress module;

a first egress module;

an alternate egress module; and a forwarding mechanism for forwarding information between said ingress module, said first egress module, and said alternate egress module;

wherein said ingress module sends a first set of information to said forwarding mechanism to be forwarded to said first egress module via a first route, said first set of information intended to be forwarded by said first egress module to a destination external to said router, said first set of information traversing a path which encompasses at least a portion of said first route, said forwarding mechanism detecting a failure which precludes forwarding of said first set of information to said first egress module, and in response to said failure, said forwarding mechanism directing a message to said ingress module informing said ingress module of said failure, and based upon said message, said ingress module determining that said first egress module has failed, and in response to said message, said ingress module selecting said alternate egress module and sending a future set of information to said forwarding mechanism to be forwarded to said alternate egress module, said future set of information intended to be forwarded by said alternate egress module to said destination;

wherein said forwarding mechanism directs said message to said ingress module by:

identifying said ingress module;

accessing a routing table which comprises one or more routes to said ingress module;

obtaining a return route from said routing table, wherein said return route directs said message to said ingress module along a different path than that traversed by said first set of information; and sending said message to said ingress module via said return route; and wherein said first set of information and said future set of information are both part of a flow, wherein said ingress module, in response to said message, prevents other sets of information associated with said flow from being sent from said ingress module to said first egress module, wherein said first egress module and said alternate egress module are predetermined, wherein said ingress module comprises a memory, wherein identifiers associated with said first egress module and said alternate egress module are stored within a flow block associated with said flow, said flow block being stored in said memory, and wherein said ingress module prevents other sets of information associated with said flow from being sent from said ingress module to said first egress module by storing an indication in said flow block that all sets of information associated with said flow are not to be sent to said first egress module.

8. A router, comprising:

an ingress module;

a first egress module;

an alternate egress module; and a forwarding mechanism for forwarding information between said ingress module, said first egress module, and said alternate egress module;

wherein said ingress module sends a first set of information to said forwarding mechanism to be forwarded to said first egress module via a first route, said first set of information intended to be forwarded by said first egress module to a destination external to said router, said first set of information traversing a path which encompasses at least a portion of said first route, said forwarding mechanism detecting a failure which precludes forwarding of said first set of information to said first egress module, and in response to said failure, said forwarding mechanism directing a message to said ingress module informing said ingress module of said failure, and based upon said message, said ingress module determining that said first egress module has failed, and in response to said message, said ingress module selecting said alternate egress module and sending a future set of information to said forwarding mechanism to be forwarded to said alternate egress module, said future set of information intended to be forwarded by said alternate egress module to said destination;

wherein said forwarding mechanism directs said message to said ingress module by:
  identifying said ingress module;
  accessing a routing table which comprises one or more routes to said ingress module;
  obtaining a return route from said routing table, wherein said return route directs said message to said ingress module along a different path than that traversed by said first set of information; and
  sending said message to said ingress module via said return route; and wherein said first set of information and said future set of information are both part of a flow, wherein said ingress module, in response to said message, causes other sets of information associated with said flow to be sent from said ingress module to said alternate egress module via said forwarding mechanism, wherein said first egress module and said alternate egress module are predetermined, wherein said ingress module comprises a memory, wherein identifiers associated with said first egress module and said alternate egress module are stored within a flow block associated with said flow, said flow block being stored in said memory, and wherein said ingress module causes other sets of information associated with said flow to be sent from said ingress module to said alternate egress module by storing an indication in said flow block that all sets of information associated with said flow are to be sent to said alternate egress module.

9. A router, comprising:
an ingress module;
a first egress module;
an alternate egress module; and
a forwarding mechanism for forwarding information between said ingress module, said first egress module, and said alternate egress module;
wherein said ingress module sends a first set of information to said forwarding mechanism to be forwarded to said first egress module via a first route, said first set of information intended to be forwarded by said first egress module to a destination external to said router, said first set of information traversing a path which encompasses at least a portion of said first route, said forwarding mechanism detecting a failure which precludes forwarding of said first set of information to said first egress module, and in response to said failure, said forwarding mechanism directing a message to said ingress module informing said ingress module of said failure, and based upon said message, said ingress module determining that said first egress module has failed, and in response to said message, said ingress module selecting said alternate egress module and sending a future set of information to said forwarding mechanism to be forwarded to said alternate egress module, said future set of information intended to be forwarded by said alternate egress module to said destination;

wherein said forwarding mechanism directs said message to said ingress module by:
  identifying said ingress module;
  accessing a routing table which comprises one or more routes to said ingress module;
  obtaining a return route from said routing table, wherein said return route directs said message to said ingress module along a different path than that traversed by said first set of information; and
  sending said message to said ingress module via said return route; and wherein said first set of information and said future set of information are both part of a flow, wherein said first egress module and said alternate egress module are predetermined, wherein said ingress module comprises a memory, wherein identifiers associated with said first egress module and said alternate egress module are stored within a flow block associated with said flow, said flow block being stored in said memory, and wherein said ingress module selects said alternate egress module by accessing said flow block to access the identifier associated with said alternate egress module.

10. A router, comprising:
an ingress module;
a first egress module;
an alternate egress module; and
a forwarding mechanism for forwarding information between said ingress module, said first egress module, and said alternate egress module;
wherein said ingress module sends a first set of information to said forwarding mechanism to be forwarded to said first egress module via a first route, said first set of information intended to be forwarded by said first egress module to a destination external to said router, said first set of information traversing a path which encompasses at least a portion of said first route, said first egress module detecting an external failure which precludes said first egress module from forwarding said first set of information to said destination, and in response to said external failure, said first egress module directing a message to said ingress module informing said ingress module of said external failure, and in response to said message, said ingress module selecting said alternate egress module and sending a future set of information to said forwarding mechanism to be forwarded to said alternate egress module, said future set of information intended to be forwarded by said alternate egress module to said destination;

wherein said first egress module directs said message to said ingress module by:
  identifying said ingress module;
  accessing a routing table which comprises one or more routes to said ingress module;
  obtaining a return route from said routing table, wherein said return route directs said message to said ingress module along a different path than that traversed by said first set of information; and sending said message to said ingress module via said return route; and wherein said first set of information and said future set of information are both part of a flow, wherein said ingress module, in response to said message, prevents other sets of information associated with said flow from being sent from said ingress module to said first egress module, wherein said first egress module and said alternate egress module are predetermined, wherein said ingress module comprises a memory, wherein identifiers associated with said first egress module and said alternate egress module are stored within a flow block associated with said flow, said flow block being stored in said memory, and wherein said ingress module prevents other sets of information associated with said flow from being sent from said ingress module to said first egress module by storing an indication in said flow block that all sets of information associated with said flow are not to be sent to said first egress module.

11. A router, comprising:

an ingress module;

a first egress module;

an alternate egress module; and a forwarding mechanism for forwarding information between said ingress module, said first egress module, and said alternate egress module;

wherein said ingress module sends a first set of information to said forwarding mechanism to be forwarded to said first egress module via a first route, said first set of information intended to be forwarded by said first egress module to a destination external to said router, said first set of information traversing a path which encompasses at least a portion of said first route, said first egress module detecting an external failure which precludes said first egress module from forwarding said first set of information to said destination, and in response to said external failure, said first egress module directing a message to said ingress module informing said ingress module of said external failure, and in response to said message, said ingress module selecting said alternate egress module and sending a future set of information to said forwarding mechanism to be forwarded to said alternate egress module, said future set of information intended to be forwarded by said alternate egress module to said destination;

wherein said first egress module directs said message to said ingress module by:

identifying said ingress module;

accessing a routing table which comprises one or more routes to said ingress module;

obtaining a return route from said routing table, wherein said return route directs said message to said ingress module along a different path than that traversed by said first set of information; and sending said message to said ingress module via said return route; and wherein said first set of information and said future set of information are both part of a flow, wherein said ingress module, in response to said message, causes other sets of information associated with said flow to be sent from said ingress module to said alternate egress module via said forwarding mechanism, wherein said first egress module and said alternate egress module are predetermined, wherein said ingress module comprises a memory, wherein identifiers associated with said first egress module and said alternate egress module are stored within a flow block associated with said flow, said flow block being stored in said memory, and wherein said ingress module causes other sets of information associated with said flow to be sent from said ingress module to said alternate egress module by storing an indication in said flow block that all sets of information associated with said flow are to be sent to said alternate egress module.

12. A router, comprising:

an ingress module;

a first egress module;

an alternate egress module; and a forwarding mechanism for forwarding information between said ingress module, said first egress module, and said alternate egress module;

wherein said ingress module sends a first set of information to said forwarding mechanism to be forwarded to said first egress module via a first route, said first set of information intended to be forwarded by said first egress module to a destination external to said router, said first set of information traversing a path which encompasses at least a portion of said first route, said first egress module detecting an external failure which precludes said first egress module from forwarding said first set of information to said destination, and in response to said external failure, said first egress module directing a message to said ingress module informing said ingress module of said external failure, and in response to said message, said ingress module selecting said alternate egress module and sending a future set of information to said forwarding mechanism to be forwarded to said alternate egress module, said future set of information intended to be forwarded by said alternate egress module to said destination;

wherein said first egress module directs said message to said ingress module by:

identifying said ingress module;

accessing a routing table which comprises one or more routes to said ingress module;

obtaining a return route from said routing table, wherein said return route directs said message to said ingress module along a different path than that traversed by said first set of information; and sending said message to said ingress module via said return route; and wherein said first set of information and said future set of information are both part of a flow, wherein said first egress module and said alternate egress module are predetermined, wherein said ingress module comprises a memory, wherein identifiers associated with said first egress module and said alternate egress module are stored within a flow block associated with said flow, said flow block being stored in said memory, and wherein said ingress module selects said alternate egress module by accessing said flow block to access the identifier associated with said alternate egress module.

* * * * *